United States Patent
Nishiyama et al.

(10) Patent No.: US 11,746,249 B2
(45) Date of Patent: Sep. 5, 2023

(54) POLYVINYL CHLORIDE AGGREGATE PARTICLES, METHOD FOR PRODUCING THE SAME, COMPOSITION FOR METAL CAN COATING MATERIAL, COMPOSITION FOR MARKING FILM, AND COATING FILM

(71) Applicant: KANEKA CORPORATION, Osaka (JP)

(72) Inventors: Yoshitaka Nishiyama, Hyogo (JP); Fumihiro Mitamura, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 611 days.

(21) Appl. No.: 16/970,587

(22) PCT Filed: Feb. 12, 2019

(86) PCT No.: PCT/JP2019/004883
§ 371 (c)(1),
(2) Date: Aug. 17, 2020

(87) PCT Pub. No.: WO2019/159896
PCT Pub. Date: Aug. 22, 2019

(65) Prior Publication Data
US 2021/0130640 A1    May 6, 2021

(30) Foreign Application Priority Data
Feb. 16, 2018 (JP) .................................. 2018-026182

(51) Int. Cl.
| | | |
|---|---|---|
| *C09D 127/06* | (2006.01) | |
| *C08F 114/06* | (2006.01) | |
| *C08L 27/06* | (2006.01) | |
| *C08L 67/00* | (2006.01) | |
| *C09D 133/00* | (2006.01) | |
| *C09D 161/06* | (2006.01) | |
| *C09D 163/00* | (2006.01) | |
| *C09D 167/00* | (2006.01) | |
| *C08J 3/16* | (2006.01) | |
| *C08F 6/22* | (2006.01) | |

(52) U.S. Cl.
CPC .............. *C09D 127/06* (2013.01); *C08F 6/22* (2013.01); *C08F 114/06* (2013.01); *C08J 3/16* (2013.01); *C08L 27/06* (2013.01); *C08L 67/00* (2013.01); *C09D 133/00* (2013.01); *C09D 161/06* (2013.01); *C09D 163/00* (2013.01); *C09D 167/00* (2013.01)

(58) Field of Classification Search
CPC .. C08F 114/06; C08F 6/18; C08F 6/22; C08L 27/06; C09D 127/06; C09J 127/06; C08J 2327/06; C08J 3/12; C08J 3/122; C08J 3/16
See application file for complete search history.

(56) References Cited

U.S. PATENT DOCUMENTS

| | | | | |
|---|---|---|---|---|
| 4,501,870 A | * | 2/1985 | Kidoh ..................... | C08F 14/06 524/297 |
| 2013/0167287 A1 | | 7/2013 | Ueda et al. | |
| 2014/0088222 A1 | | 3/2014 | Ueda et al. | |
| 2014/0237702 A1 | | 8/2014 | Ueda et al. | |

FOREIGN PATENT DOCUMENTS

| | | | | |
|---|---|---|---|---|
| CN | 107286512 A | * | 10/2017 | ............ B29C 48/92 |
| JP | S55-89363 A | | 7/1980 | |
| JP | S59-68376 A | | 4/1984 | |
| JP | H0234648 A | | 2/1990 | |
| JP | 2004224838 A | | 8/2004 | |
| JP | 2007284512 A | | 11/2007 | |
| JP | 2016107496 A | | 6/2016 | |
| JP | 2017160307 A | | 9/2017 | |
| WO | 2008041697 A1 | | 4/2008 | |
| WO | 2012035830 A1 | | 3/2012 | |
| WO | 2012165021 A1 | | 12/2012 | |

OTHER PUBLICATIONS

Partial translation of CN-107286512-A (2017).*
International Search report issued in International Application No. PCT/JP2019/004883, dated May 7, 2019 (2 pages).
Written Opinion issued in International Application No. PCT/JP2019/004883, dated May 7, 2019 (3 pages).

* cited by examiner

*Primary Examiner* — Kregg T Brooks
(74) *Attorney, Agent, or Firm* — Osha Bergman Watanabe & Burton LLP

(57) ABSTRACT

The present invention relates to polyvinyl chloride aggregate particles, in which a particle diameter D50 at a cumulative volume percentage of 50 vol % in a volume particle size distribution is 0.5 µm or more and 5.0 µm or less, and a particle diameter D90 at a cumulative volume percentage of 90 vol % in the volume particle size distribution is 8.0 µm or less, and a Na concentration in the polyvinyl chloride aggregate particles is 90 ppm or less. The present invention relates to a composition for a metal can coating material, a composition for a marking film and a method for producing the same, and a coating film that contain the polyvinyl chloride aggregate particles. This provides polyvinyl chloride aggregate particles capable of imparting high transparency and retort resistance to a coating film of a metal can, and/or capable of imparting high transparency and water resistance to a marking film.

12 Claims, No Drawings

POLYVINYL CHLORIDE AGGREGATE PARTICLES, METHOD FOR PRODUCING THE SAME, COMPOSITION FOR METAL CAN COATING MATERIAL, COMPOSITION FOR MARKING FILM, AND COATING FILM

TECHNICAL FIELD

The present invention relates to polyvinyl chloride aggregate particles, a method for producing the same, and a composition for a metal can coating material, a composition for a marking film, and a coating film that contain the same.

BACKGROUND ART

Polyvinyl chloride is inexpensive and has good workability and durability, and thus is used in a coating material for a metal can a marking film, and the like. Patent Documents 1 to 3 disclose coating compositions for a metal can that contain a polyvinyl chloride, for example. Patent Documents 4 and 5 disclose marking films that contain a polyvinyl chloride.

On the other hand, Patent Documents 6 to 8 propose polyvinyl chloride aggregate particles capable of providing plastisol whose impermeability to fabric is improved by adjusting an average particle diameter thereof.

PRIOR ART DOCUMENTS

Patent Document

[Patent Document 1] JP S55-89363A
[Patent Document 2] JP S59-68376A
[Patent Document 3] JP H2-34648A
[Patent Document 4] JP 2016-107496A
[Patent Document 5] JP 2017-160307A
[Patent Document 6] WO 2008/041697
[Patent Document 7] WO 2012/165021
[Patent Document 8] WO 2012/035830

DISCLOSURE OF INVENTION

Problem to be Solved by the Invention

However, in the case of the coating compositions for a metal can disclosed in Patent Documents 1 to 3, transparency and retort resistance of coating films need to be further improved. Also, in the case of the marking films containing polyvinyl chloride that were disclosed in Patent Documents 4 and 5, transparency and water resistance thereof need to be further improved. On the other hand, in Patent Documents 6 to 8, usage of polyvinyl chloride aggregate particles in a coating material for a metal can or a marking film was not studied.

In order to resolve the above-described conventional issues, the present invention provides polyvinyl chloride aggregate particles capable of imparting high transparency and retort resistance to a coating film of a metal can, or/and capable of imparting high transparency and water resistance to a marking film, a method for producing the same, and a composition for a metal can coating material, a composition for a marking film, and a coating film that contain the same.

Means for Solving Problem

The present invention relates to polyvinyl chloride aggregate particles in which a particle diameter D50 at a cumulative volume percentage of 50 vol % in a volume particle size distribution is 0.5 μm or more and 5.0 μm or less, and a particle diameter D90 at a cumulative volume percentage of 90 vol % in the volume particle size distribution is 8.0 μm or less, and a Na concentration in the polyvinyl chloride aggregate particles is 90 ppm or less.

It is preferable that the polyvinyl chloride aggregate particles are aggregates of polyvinyl chloride latex particles, and the polyvinyl chloride latex particles include polyvinyl chloride latex particles having a volume average particle diameter of 0.1 μm or more and less than 0.6 μm in an amount of 5 vol % or more and 95 vol % or less, and polyvinyl chloride latex particles having a volume average particle diameter of 0.6 μm or more and 2.0 μm or less in an amount of 5 vol % or more and 95 vol % or less. It is preferable that, in the polyvinyl chloride aggregate particles, the average degree of polymerization of the polyvinyl chloride is 1400 or more and 2500 or less.

Also, the present invention relates to a method for producing the polyvinyl chloride aggregate particles, the method including a step of obtaining a coagulated latex of a polyvinyl chloride by coagulating a polyvinyl chloride latex in which the concentration of resin solids is 22 wt % or more by adding, to the polyvinyl chloride latex, a coagulating agent containing an inorganic acid in an amount of 10 wt % or more, a step of obtaining a slurry containing the polyvinyl chloride aggregate particles by subjecting the coagulated latex of the polyvinyl chloride to heat treatment in a temperature range of Tg or more and Tg+35° C., or less, where a glass transition temperature of the polyvinyl chloride is Tg, a step of adjusting a pH of the slurry containing the polyvinyl chloride aggregate particles such that the slurry has a pH of 4 or more and 11 or less, a step of dehydrating the slurry whose pH has been adjusted and that contains the polyvinyl chloride aggregate particles, and washing the resulting slurry by adding an amount of water having a weight that is 2 times or more and 100 times or less the weight of the resin solids, and a step of dehydrating and drying the washed slurry containing the polyvinyl chloride aggregate particles, and crushing and/or classifying the resulting material.

It is preferable that the polyvinyl chloride latex contains polyvinyl chloride latex particles having a volume average particle diameter of 0.1 μm or more and less than 0.6 μm in an amount of 5 vol % or more and 95 vol % or less, and polyvinyl chloride latex particles having a volume average particle diameter of 0.6 μm or more and 2.0 μm or less in an amount of 5 vol % or more and 95 vol % or less. It is preferable to perform the heat treatment at a temperature of 75° C., or more and 95° C., or less. It is preferable that, after the slurry whose pH has been adjusted and that contains the polyvinyl chloride aggregate particles is dehydrated, the resulting material is washed by adding an amount of water having a weight that is greater than 20 times the weight of the resin solids.

Also, the present invention relates to a composition for a metal can coating material that contains the polyvinyl chloride aggregate particles.

It is preferable that the composition for a metal can coating material contains (A) the polyvinyl chloride aggregate particles in an amount of 20 parts by weight or more and 80 parts by weight or less, (B) at least one or more resins selected from the group consisting of phenolic resins, epoxy resins, and acrylic resins in an amount of 1 part by weight or more and 30 parts by weight or less. (C) a polyester-based resin in an amount of 1 part by weight or more and 60 parts by weight or less, and (D) an organic solvent, and a total amount of (A), (B), and (C) is 100 parts by weight.

Also, the present invention relates to a composition for a marking film containing the polyvinyl chloride aggregate particles.

It is preferable that the composition for a marking film contains (a) the polyvinyl chloride aggregate particles in an amount of 50 parts by weight or more and 90 parts by weight or less, (b) a plasticizer in an amount of 10 parts by weight or more and 50 parts by weight or less, and (c) an organic solvent, and a total amount of (a) and (b) is 100 parts by weight.

Also, the present invention relates to a coating film made of a composition containing the polyvinyl chloride aggregate particles, in which the coating film has a thickness of 20 μm or less, has a haze value of 10.0% or less, and a gloss value of 50 or more, the gloss value being determined after the coating film is immersed in pure water for 90 minutes in an atmosphere of 0.26 MPa and 121° C.

Effects of the Invention

According to polyvinyl chloride aggregate particles of the present invention, it is possible to provide a composition for a metal can coating material for imparting high transparency and retort resistance to a coating film of a metal can. Also, according to the polyvinyl chloride aggregate particles of the present invention, it is possible to provide a composition for a marking film for imparting high transparency and water resistance to a marking film. Also, the present invention can provide a thin coating film having high transparency and retort resistance.

According to a production method of the present invention, it is possible to obtain polyvinyl chloride aggregate particles for providing a composition for a metal can coating material for imparting high transparency and retort resistance to a coating film of a metal can, or/and providing a composition for a marking film for imparting high transparency and water resistance to a marking film.

DESCRIPTION OF THE INVENTION

Inventors of the present invention found that, when a coating film of a metal can is formed using a composition containing a polyvinyl chloride, by using, as the polyvinyl chloride, polyvinyl chloride aggregate particles having a specific particle diameter and having a Na concentration of a predetermined value or less, it is possible to impart high transparency and good retort resistance to the coating film of the metal can. Also, the inventors found that, when polyvinyl chloride aggregate particles having a specific particle diameter and having a Na concentration of a predetermined value or less are used as a polyvinyl chloride and a marking film is made of a composition containing the polyvinyl chloride aggregate particles, it is possible to obtain the marking film having high transparency and good water resistance.

Polyvinyl Chloride Aggregate Particles

With polyvinyl chloride aggregate particles, a particle diameter D50 (also simply referred to as D50 hereinafter) at a cumulative volume percentage of 50 vol % in a volume particle size distribution is 0.5 μm or more and 5.0 μm or less, and a particle diameter D90 (also referred to as D90 hereinafter) at a cumulative volume percentage of 90 vol % in the volume particle size distribution is 8.0 μm or less. When D50 and D90 of the polyvinyl chloride aggregate particles are in the above-described ranges, a coating film of a metal can that is obtained using a composition containing the polyvinyl chloride aggregate particles has good transparency as well as good retort resistance, that is, good adhesiveness and gloss after a retort test. Also, when D50 and D90 of the polyvinyl chloride aggregate particles are in the above-described ranges, a marking film obtained using a composition containing the polyvinyl chloride aggregate particles has good transparency as well as good water resistance. Note that, when D50 is 0.5 μm or more, polyvinyl chloride aggregate particles can be obtained at high productivity. In the present invention, D50 and D90 are determined from a volume-based particle diameter distribution, and the particle diameter distribution of the particles can be measured using a MICROTRAC Model HRA9320-X100 (manufactured by NIKKISO CO., LTD.), which is a laser diffraction particle size distribution measuring apparatus.

From the viewpoint of transparency and retort resistance and/or water resistance, D50 of the polyvinyl chloride aggregate particles is preferably 0.5 μm or more and 4.5 μm or less, more preferably 0.5 μm or more and 4.0 μm or less, even more preferably 0.5 μm or more and 3.5 μm or less, still more preferably 1.0 μm or more and 3.5 μm or less, yet more preferably 1.0 μm or more and 3.0 μm or less, and yet more preferably 1.0 μm or more and 2.5 μm or less, and particularly preferably 1.0 μm or more and 2.0 μm or less.

From the viewpoint of transparency, and retort resistance and/or water resistance, D90 of the polyvinyl chloride aggregate particles is preferably 7.5 μm or less, more preferably 7.0 μm or less, even more preferably 6.5 μm or less, still more preferably 6.0 μm or less, yet more preferably 5.5 μm or less, and particularly preferably 5.0 μm or less.

The Na concentration in the polyvinyl chloride aggregate particles is 90 ppm or less. Polyvinyl chloride aggregate particles usually contain Na (ions) originating from an emulsifying agent used in polymerization of a polyvinyl chloride, a coagulating agent used to aggregate a polyvinyl chloride, or the like. In this application, by reducing the Na concentration in the polyvinyl chloride aggregate particles to 90 ppm or less, a coating film of a metal can that is obtained using a composition containing the polyvinyl chloride aggregate particles has good transparency as well as good retort resistance, that is, good adhesiveness and gloss after a retort test. Also, when the Na concentration in the polyvinyl chloride aggregate particles is 90 ppm or less, a marking film obtained using a composition containing the polyvinyl chloride aggregate particles has good transparency as well as good water resistance. In the present invention, the Na concentration in the polyvinyl chloride aggregate particles can be measured through inductively coupled plasma mass spectrometry (ICP-MS).

From the viewpoint of transparency and retort resistance and/or water resistance, the Na concentration in the polyvinyl chloride aggregate particles is preferably 85 ppm or less, more preferably 80 ppm or less, even more preferably 75 ppm or less, still more preferably 70 ppm or less, yet more preferably 65 ppm or less, yet more preferably 60 ppm or less, yet more preferably 55 ppm or less, and particularly preferably 50 ppm or less.

The moisture absorptivity of the polyvinyl chloride aggregate particles that is determined when the polyvinyl chloride aggregate particles are stored for 24 hours under the conditions that the temperature is 30° C., and a relative humidity is 97.0±0.4% (a test performed using a desiccator method with use of a saturated aqueous solution of potassium sulfate) according to an operation procedure of JIS A 1475 is preferably 1.5 wt % or less, more preferably 1.0 wt % or less, and even more preferably 0.75 wt % or less. When the moisture absorptivity is in the above-described range, the viscosity stability of a composition containing polyvinyl chloride aggregate particles during storage is improved.

It is preferable that the polyvinyl chloride aggregate particles are aggregates of polyvinyl chloride latex particles, and it is preferable that the polyvinyl chloride latex particles have a volume average particle diameter of 0.1 µm or more and 2.0 µm or less. More preferably, the polyvinyl chloride latex particles include polyvinyl chloride latex particles (also referred to as polyvinyl chloride latex particles F hereinafter) having a volume average particle diameter of 0.1 µm or more and less than 0.6 µm in an amount of 5 vol % or more and 95 vol % or less, and polyvinyl chloride latex particles (also referred to as polyvinyl chloride latex particles R hereinafter) having a volume average particle diameter of 0.6 µm or more and 2.0 µm or less in an amount of 5 vol % or more and 95 vol % or less. The composition containing polyvinyl chloride aggregate particles obtained through aggregation of polyvinyl chloride latex particles having different particle diameters in the above described range has low viscosity, contains few coarse particles, and has a high gelation rate, and thus the composition has good transparency, and retort resistance and/or water resistance, and a thin coating film can be easily obtained. From the viewpoint of further reducing viscosity and increasing the transparency of a film, for example, it is more preferable that the polyvinyl chloride aggregate particles include polyvinyl chloride latex particles having a volume average particle diameter of 0.1 µm or more and less than 0.6 µm in an amount of 5 vol % or more and 50 vol % or less, and polyvinyl chloride latex particles having a volume average particle diameter of 0.6 µm or more and 2.0 µm or less in an amount of 50 vol % or more and 95 vol % or less. In the present invention, the volume average particle diameter of polyvinyl chloride latex particles that constitute polyvinyl chloride aggregate particles can be determined from a volume-based particle diameter distribution with use of as measurement samples, particles obtained by adding a nonionic surfactant to polyvinyl chloride aggregate particles and dissolving the polyvinyl chloride aggregate particles in polyvinyl chloride latex particles, and the particle diameter distribution can be measured using MICROTRAC Model HRA9320-X100 (manufactured by NIKKISO CO., LTD.), which is a laser diffraction particle size distribution measuring apparatus.

From the viewpoint of realizing low viscosity and facilitating gelation, the polyvinyl chloride aggregate particles preferably include polyvinyl chloride latex particles F in an amount of 10 vol % or more and 90 vol % or less, and polyvinyl chloride latex particles R in an amount of 10 vol % or more and 90 vol % or less; more preferably include polyvinyl chloride latex particles F in an amount of 15 vol % or more and 85 vol % or less, and polyvinyl chloride latex particles R in an amount of 15 vol % or more and 85 vol % or less; and even more preferably include polyvinyl chloride latex particles F in an amount of 20 vol % or more and 50 vol % or less, and polyvinyl chloride latex particles R in an amount of 50 vol % or more and 80 vol % or less. From the stability of polymerization of a polyvinyl chloride, the volume average particle diameter of the polyvinyl chloride latex particles R is preferably 1.7 µm or less, and more preferably 1.4 µm or less. From the viewpoint of realizing low viscosity and facilitating gelation, the volume average particle diameter of the polyvinyl chloride latex particles F is 0.5 µm or less, and more preferably 0.4 µm or less.

It is preferable that, in the polyvinyl chloride aggregate particles, the average degree of polymerization of the polyvinyl chloride is 1400 or more and 2500 or less. When the average degree of polymerization of a polyvinyl chloride is in the above-described range, the retort resistance of a coating film of a metal can obtained using a composition containing polyvinyl chloride aggregate particles is likely to be improved. The average degree of polymerization of the polyvinyl chloride is more preferably 1500 or more and 2500 or less, and even more preferably 1600 or more and 2500 or less.

Next, a method for producing polyvinyl chloride aggregate particles of the present invention will be described. Polyvinyl chloride aggregate particles of the present invention can be obtained through aggregation of polyvinyl chloride particles (latex particles). Specifically, the polyvinyl chloride aggregate particles of the present invention can be obtained by subjecting, to heat treatment, a coagulated latex of a polyvinyl chloride obtained by coagulating a polyvinyl chloride latex by adding a coagulating agent to the polyvinyl chloride latex, adjusting a pH of the obtained slurry containing the polyvinyl chloride aggregate particles, dehydrating the slurry whose pH has been adjusted and that contains the polyvinyl chloride aggregate particles washing the resulting slurry dehydrating and drying the washed slurry containing polyvinyl chloride aggregate particles, and crushing and/or classifying the resulting material.

First, a coagulated latex of a polyvinyl chloride is obtained by coagulating a polyvinyl chloride latex by adding a coagulating agent thereto. There is no particular limitation on the amount of the added coagulating agent as long as a polyvinyl chloride latex can be coagulated, and it is preferable that the amount of the added coagulating agent is 0.3 parts by weight or more and 5 parts by weight or less with respect to 100 parts by weight of the resin solids in the polyvinyl chloride latex. When the amount of the added coagulating agent is 0.3 parts by weight or more, coagulation of the polyvinyl chloride latex sufficiently progresses. Also, when the amount of the added coagulating agent is 5 parts by weight or less, production costs can be reduced, and productivity is improved.

The coagulating agent contains an inorganic acid in an amount of 10 wt % or more with respect to the total weight of the coagulating agent. Because the content of the inorganic acid with respect to the total weight of the coagulating agent is 10 wt % or more, it is likely that the moisture absorptivity of polyvinyl chloride aggregate particles is low, and the viscosity of a composition containing the polyvinyl chloride aggregate particles during storage is stabilized. The inorganic acid content in the coagulating agent is preferably 20 wt % or more, more preferably 30 wt % or more, even more preferably 50 wt % or more, still more preferably 70 wt % or more, and particularly preferably 100 wt %.

There is no particular limitation on the inorganic acid, and for example, it is possible to use sulfuric acid, hydrochloric acid, nitric acid, phosphoric acid, or the like. From the viewpoint of wastewater treatment, it is preferable that the inorganic acid is at least one selected from the group consisting of sulfuric acid and hydrochloric acid.

From the viewpoint that a homogenous coagulated latex can be obtained in a short period of time, the coagulating agent may include a water-soluble coagulating agent in addition to an inorganic acid. Examples of the water-soluble coagulating agent include inorganic salts, organic acids, organic salts, and water-soluble polymers.

It is possible to use NaCl, KCl, $Na_2SO_4$, $CaCl_2$, $AlCl_3$, $Al_2(SO_4)_3$, or the like as the inorganic salt, for example. There is no particular limitation on the organic acids, and for example, it is possible to use citric acid, malic acid, tartaric acid, gluconic acid, succinic acid, malonic acid, glutaric acid, maleic acid, fumaric acid, glutaconic acid, or the like as the organic acid. It is possible to use sodium acetate, calcium acetate, or the like as the organic salt, for example.

It is possible to use a synthetic polymer, a natural polymer, a semisynthetic polymer, or the like as the water-soluble polymer, for example. Examples of the synthetic polymer include polymers of acryloyl group-containing monomers, vinyl polymers, polyamidines, polyethylene oxides, and polyethylenimines. Examples of the natural polymer include polysaccharides and proteins. Examples of the semisynthetic polymer include cellulose ether and starch derivatives. Note that, if a water-soluble polymer is used as a coagulating agent other than the above-described inorganic acid, from the viewpoint of reducing the moisture absorptivity of polyvinyl chloride aggregate particles, the amount of blended water-soluble polymers is preferably 25 wt % or less, and more preferably 10 wt % or less, with respect to the total weight of the coagulating agent.

From the viewpoint of reducing the moisture absorptivity of polyvinyl chloride aggregate particles and stabilizing the viscosity of a composition containing the polyvinyl chloride aggregate particles during storage, it is preferable to use one or more selected from the group consisting of inorganic salts, organic acids, and organic salts as the coagulating agent other than the inorganic acids.

The coagulating agent may be in the form of either a solid or an aqueous solution when the coagulating agent is added to a polyvinyl chloride latex, and from the viewpoint of dispersiveness, the aqueous solution form is preferable, and it is more preferable to add the coagulating agent to a polyvinyl chloride latex in a flowing state through stirring or mixing. Also, it is preferable to add the coagulating agent to a polyvinyl chloride latex after polymerization of a polyvinyl chloride ends.

There is no particular limitation on the polyvinyl chloride latex, and for example, the polyvinyl chloride latex can be obtained through emulsion polymerization, seeded emulsion polymerization, fine suspension polymerization, or seeded fine suspension polymerization by adding, in an aqueous medium, for example, a polymerization initiator and an emulsifying agent to a vinyl chloride monomer or a mixture of a vinyl chloride monomer and a monomer that is copolymerizable with the vinyl chloride monomer. Also, a dispersion auxiliary agent such as a higher alcohol or a higher fatty acid, and a pH adjusting agent such as sodium hydrogen carbonate or sodium carbonate may be used in the above-described polymerization as needed.

There is no particular limitation on the volume average particle diameter of polyvinyl chloride latex particles in the polyvinyl chloride latex, and from the viewpoint of the stability of polymerization, it is preferable that the polyvinyl chloride latex particles have a volume average particle diameter of 0.1 µm or more and 2.0 µm or less. When the volume average particle diameter of polyvinyl chloride latex particles is 0.1 µm or more, the mechanical stability thereof while the latex is transferred is improved, and productivity is improved. When the volume average particle diameter of polyvinyl chloride latex particles is 2.0 µm or less, the stability of polymerization is increased. From the viewpoint of stability of polymerization, the volume average particle diameter of the polyvinyl chloride latex particles is more preferably 1.7 µm or less, and even more preferably 1.4 µm or less.

From the viewpoint of reducing the viscosity of a composition containing polyvinyl chloride aggregate particles and facilitating gelation, the polyvinyl chloride latex preferably contains polyvinyl chloride latex particles F in an amount of 5 vol % or more and 95 vol % or less and polyvinyl chloride latex particles R in an amount of 5 vol % or more and 95 vol % or less, more preferably contains polyvinyl chloride latex particles F in an amount of 10 vol % or more and 90 vol % or less and polyvinyl chloride latex particles R in an amount of 10 vol % or more and 90 vol % or less, even more preferably contains polyvinyl chloride latex particles F in an amount of 15 vol % or more and 85 vol % or less and polyvinyl chloride latex particles R in an amount of 15 vol % or more and 85 vol % or less, and still more preferably contains polyvinyl chloride latex particles F in an amount of 20 vol % or more and 50 vol % or less and polyvinyl chloride latex particles R in an amount of 50 vol % or more and 80 vol % or less. From the stability of polymerization of a polyvinyl chloride, the volume average particle diameter of the polyvinyl chloride latex particles R is 1.7 µm or less, and more preferably 1.4 µm or less. From the viewpoint of realizing low viscosity and facilitating gelation, the volume average particle diameter of the polyvinyl chloride latex particles F is 0.5 µm or less, and more preferably 0.4 µm or less.

There is no particular limitation on the monomer that is copolymerizable with the vinyl chloride monomer, and for example, it is possible to use all the monomers that are copolymerizable with vinyl chloride, such as olefins such as ethylene, propylene, and butene; vinyl esters such as vinyl acetate, vinyl propionate, and vinyl stearate; vinyl ethers such as methyl vinyl ether, ethyl vinyl ether, octyl vinyl ether, and lauryl vinyl ether; vinylidenes such as vinylidene chloride; unsaturated carboxylic acids and acid anhydrides thereof such as acrylic acid, methacrylic acid, fumaric acid, maleic acid, itaconic acid, maleic anhydride, and itaconic anhydride; unsaturated carboxylic acid esters such as methyl acylate, ethyl acrylate, monomethyl maleate, dimethyl maleate, and butyl benzyl maleate; aromatic vinyl compounds such as styrene, α-methylstyrene, and divinylbenzene; unsaturated nitriles such as acrylonitrile; and crosslinkable monomers such as diallyl phthalate. These monomers may be used alone or in combination of two or more. It is preferable that the amount of these monomers used is less than 50 wt % in a mixture of a vinyl chloride monomer and the used monomers.

There is no particular limitation on the emulsifying agent, and for example, it is possible to use an anionic surfactant. Examples of the anionic surfactant include potassium salts, sodium salts, and ammonium salts of fatty acids, alkyl sulfates, alkylbenzene sulfonic acids, alkylsulfosuccinic acids, α-olefin sulfonic acids, and alkyl ether phosphoric acid esters. From the viewpoint of the viscosity stability of a composition containing polyvinyl chloride aggregate particles, the emulsifying agent is preferably a fatty acid salt, more preferably one or more selected from the group consisting of potassium salts of fatty acids, sodium salts of fatty acids, and ammonium salts of fatty acids and even more preferably one or more selected from the group consisting of sodium lauryl sulfate, potassium stearate, potassium myristate, and ammonium myristate.

It is possible to use the emulsifying agent in an amount of 0.1 parts by weight or more and 3.0 parts by weight or less per 100 parts by weight of a monomer, for example. From the viewpoint of increasing the stability of a polyvinyl chloride latex to be obtained, and the transparency of a film such as a film for a can inner surface or a marking film, the emulsifying agent is preferably used in an amount of 0.2 parts by weight or more and 1.0 part by weight or less per 100 parts by weight of a monomer, and is more preferably used in an amount of 0.2 parts by weight or more and 0.5 parts by weight or less.

Examples of the polymerization initiator include oil-soluble polymerization initiators and water-soluble polymerization initiators. It is possible to use, as the oil-soluble polymerization initiators, diacyl peroxides such as dilauroyl peroxide and di-3,5,5, trimethylhexanoyl peroxide; peroxydicarbonates such as diisopropyl peroxydicarbonate and di-2-ethylhexyl peroxydicarbonate; organic peroxides such as t-butyl hydroperoxide, t-butyl peroxypivalate, and t-butyl peroxyneodecanoate; and azo-based initiators such as 2,2'-azobisisobutyronitrile, 2,2'-azobis(2,4-dimethylvaleronitrile), and 2,2'-azobis(4-methoxy-2,4-dimethylvaleronitrile), for example. Also, it is possible to use ammonium persulfate, potassium persulfate, sodium persulfate, a hydrogen peroxide solution, and the like as the water-soluble polymerization initiators. The polymerization initiators may be used alone or in combination of two or more. It is possible to use the polymerization initiator in combination of a reducing agent such as sodium sulfite, sodium thiosulfate, sodium hydroxymethanesulfinate dihydrate (also referred to as Rongalite), ascorbic acid, or sodium ascorbate, as needed. The reducing agents may be used alone or in combination of two or more.

There is no particular limitation on mixing of the polyvinyl chloride latex and the coagulating agent, and for example, it is preferable to carry out a coagulation operation with use of a mixer capable of imparting a large shearing force to a latex, such as an onlator or a vertical vibration stirrer (e.g., "VIBRO MIXER" manufactured by REICA Co., Ltd.), to homogenize a coagulated latex in a short period of time. From the viewpoint of imparting a shearing force such that a coagulated latex becomes homogeneous in a short period of time, the stirring power in a mixing (coagulation) operation is preferably 2 kW/m$^3$ or more, and more preferably 5 kW/m$^3$ or more. There is no particular limitation on the upper limit of the stirring power in the mixing operation, and from the viewpoint of installation costs, the stirring power is preferably 50 kW/m$^3$ or less.

There is no particular limitation on the temperature at which the polyvinyl chloride latex is coagulated by adding a coagulating agent thereto as long as the temperature is less than the glass transition temperature Tg of a polyvinyl chloride, and from the viewpoint of obtaining a homogeneous coagulated latex in a large shearing field in a short period of time, the temperature is preferably in a range of 5° C. or more and Tg−15° C., or less.

Ina coagulated latex of the polyvinyl chloride (also simply referred to as a "coagulated latex" hereinafter), the resin solid concentration is preferably 22 wt % or more, more preferably 25 wt % or more and 50 wt % or less, and even more preferably 30 wt % or more and 45 wt % or less. When the resin solid concentration in the coagulated latex is in the above-described range, the coagulated latex has good flowability and the coagulated latex can be easily transferred through a pipe when the coagulated latex is added into a container in which heat treatment is performed.

Then, a slurry containing polyvinyl chloride aggregate particles can be obtained by subjecting the obtained coagulated latex of a polyvinyl chloride to heat treatment in a temperature range of Tg or more and Tg+35° C., or less, where the glass transition temperature of the polyvinyl chloride is Tg. When the heat treatment temperature is Tg or more, it is possible to easily obtain polyvinyl chloride aggregate particles whose D50 and D90 are in the above-described ranges. Although the glass transition temperature of a polyvinyl chloride changes depending on the molecular weight, the copolymer composition, and the like, usually, the glass transition temperature of a polyvinyl chloride obtained from only a vinyl chloride monomer using a general polymerization method is about 80° C. Note that the glass transition temperature (Tg) can be measured using a differential scanning calorimeter (model DSC7020 manufactured by Hitachi High-Tech Science Corporation) under operation conditions at a temperature in a range of 30° C., or more and 200° C., or less and a temperature increase rate of 10° C./min. Specifically, the heat treatment temperature is preferably 75° C., or more and 95° C., or less, and more preferably 80° C., or more and 95° C., or less, and from the viewpoint of increasing the transparency of a film such as a film for a can inner surface or a marking film, the heat treatment temperature is even more preferably 80° C., or more and 90° C., or less. There is no particular limitation on the heat treatment time, and from the aspect of industrial implementation after reaching a predetermined temperature, the heat treatment time is preferably held for seconds or more and 300 minutes or less, is more preferably held for 3 minutes or more and 120 minutes or less, and is even more preferably held for 5 minutes or more and 30 minutes or less.

From the viewpoint of uniformly performing heat treatment, the heat treatment is preferably performed by mixing a coagulated latex of a polyvinyl chloride with one or more heating media selected from the group consisting of water vapor and a water bath. The type and pressure of the water vapor need only be set to increase the temperature to Tg of a polyvinyl chloride or more, and especially water vapor having a pressure of 0.1 MPa or more is preferable. When heat treatment is performed using a water bath, water vapor may be introduced into the water bath to maintain a predetermined temperature.

When heat treatment is performed by continuously adding a coagulated latex of a polyvinyl chloride to a water bath adjusted to have a predetermined temperature, and continuously extracting the coagulated latex, the average retention time thereof in a tank in which heat treatment is performed (a value obtained by dividing the introduction capacity (L of the heat treatment tank by the supply rate (Imin) of the coagulated latex and water that are continuously supplied to the heat treatment tank) corresponds to the heat treatment time, for example. There is no particular limitation on the heat treatment time, and for example, it is preferable to set the heat treatment time to 30 seconds or more.

Then, the obtained slurry containing polyvinyl chloride aggregate particles is adjusted to have a pH of 4 or more and 11 or less, preferably have a pH of 5 or more and 10 or less, and more preferably have a pH of 6 or more and 9 or less. Due to the pH being in the above-described range, the moisture absorptivity of the obtained polyvinyl chloride aggregate particles is low, and the storage stability of a composition containing the polyvinyl chloride aggregate particles is improved. There is no particular limitation on pH adjustment as long as a compound capable of adjusting the pH in the above-described range is used, and for example, sodium hydroxide or the like may be used.

Then, after the slurry whose pH has been adjusted and that contains polyvinyl chloride aggregate particles is dehydrated, the dehydrated slurry is washed through addition of water. There is no particular limitation on the dehydration, and the dehydration may be performed through filtration. The washing process is a process essential for setting the Na concentration in the obtained polyvinyl chloride aggregate particles to 90 ppm or less. The washing may be performed using pure water. The amount of pure water used for washing is two times or more and 100 times or less the weight of the dehydrated resin solids (wet resin). When the amount of pure water used for washing is in the above-described range, the Na concentration in the obtained polyvinyl chloride aggregate particles is 90 ppm or less. From the viewpoint of further reducing the Na concentration in the obtained polyvinyl chloride aggregate particles, the amount of pure water used for washing is preferably 3 times or more, more preferably 5 times or more, even more preferably 10 times or more, still more preferably greater than 20 times, yet more preferably 21 times or more, and particularly preferably 25 times or more the weight of the dehydrated resin solids (wet resin). When the amount of pure water used for washing is greater than 20 times the weight of the dehydrated resin solids (wet resin), it is possible to further reduce water-soluble residues. From the viewpoint of operability; the amount of pure water used for washing is preferably 90 times or less, more preferably 80 times or less, and even more preferably 70 times or less the weight of the dehydrated resin solids (wet resin).

Then, after the washed slurry containing polyvinyl chloride aggregate particles is dehydrated and dried, the resulting material is crushed and/or classified. There is no particular limitation on the dehydration, and the dehydration may be performed through filtration. There is no particular limitation on the drying temperature, and drying may be usually performed at a resin temperature of 35° C., or more and 100° C., or less. Polyvinyl chloride aggregate particles having desired D50 and D90 are obtained by adjusting particle diameters thereof by dehydrating and drying the slurry and crushing and/or classifying the resulting material. There is also no particular limitation on the crusher or a breaker, and for example, a roller mill, a high-speed rotary crusher, a ball mill, a jet mill, or the like may be used. From the viewpoint of that polyvinyl chloride aggregate particles having desired D50 and D90 are likely to be obtained, contamination coming from a crusher can be prevented, and high productivity can be realized, it is preferable to use a high-speed rotary crusher, or a fluidized bed jet mill crusher.

Composition for Metal Can Coating Material

A composition containing the polyvinyl chloride aggregate particles can be used as a composition for a metal can coating material. A coating film of a metal can made of the composition for a metal can coating material has high transparency and retort resistance. The composition for a metal can coating material may be a composition for a can inner surface coating material used for an inner surface of a metal can, or a composition for a can outer surface coating material used for an outer surface of a metal can, and in particular, the composition for a metal can coating material may be suitably used as a composition for a can inner surface coating material due to the composition for a metal can coating material having high retort resistance.

From the viewpoint of the workability, retort resistance, and tearability of a coating film, it is preferable that the composition for a metal can coating material contains (A) the polyvinyl chloride aggregate particles in an amount of 20 parts by weight or more and 80 parts by weight or less, (B) at least one or more resins selected from the group consisting of phenolic resins, epoxy resins, and acrylic resins in an amount of 1 part by weight or more and 30 parts by weight or less, (C) a polyester-based resin in an amount of 1 part by weight or more and 60 parts by weight or less, and (D) an organic solvent, and a total amount of (A), (B), and (C) is 100 parts by weight.

It is more preferable that the composition for a metal can coating material contains (A) the polyvinyl chloride aggregate particles in an amount of 30 parts by weight or more and 65 parts by weight or less. It is more preferable that the composition for a metal can coating material contains (B) at least one or more resins selected from the group consisting of phenolic resins, epoxy resins, and acrylic resins in an amount of 10 parts by weight or more and 20 parts by weight or less. It is more preferable that the composition for a metal can coating material contains (C) a polyester-based resin in an amount of 15 parts by weight or more and 35 parts by weight or less.

There is no particular limitation on the phenolic resin, the epoxy resin, the acrylic resin, and the polyester-based resin, and for example, a resin used for a coating film of a metal can may be usually used as appropriate.

The phenolic resin may be a product obtained through condensation of phenols and aldehydes, and both novolacs and resoles may be used. The phenols refer to compounds having a phenol skeleton, and also include compounds obtained by substituting one or more hydrogen atoms of an aromatic ring of phenol with an alkyl group, a cycloalkyl group, or an aryl group, and the like, in addition to phenol. Specifically, phenol, cresol, ethylphenol, xylenol, butylphenol, octylphenol, nonylphenol, phenylphenol cyclohexylphenol, trimethylphenol, bisphenol A, catechol, resorcinol, hydroquinone, naphthol, pyrogallol, and the like may be used alone or in combination of two or more. There is no particular limitation on the aldehydes, and for example, it is possible to use formaldehyde, acetaldehyde, butyraldehyde, acrolein, and the like. Among these compounds, formaldehyde is preferable because a reaction operation can be easily performed.

Products obtained through condensation of bisphenol A and epichlorohydrin, so-called bisphenol A epoxy resins, for example, may be used as the epoxy resin.

A polymer of an acrylic acid ester and/or a methacrylic acid ester may be used as the acrylic resin, for example. The acrylic resin may include other monomers, in addition to acrylic acid esters and/or methacrylic acid esters. Examples of the other monomers include styrene-based monomers, hydroxy-containing monomers, and acrylonitrile. The other monomers may be used alone or in combination of two or more.

From the viewpoint of tearability it is preferable to use an amorphous polyester-based resin having a hydroxy group, as the polyester-based resin, for example.

The organic solvent (a volatile component) need only dissolve a phenolic resin, an epoxy resin, an acrylic resin, and a polyester-based resin without dissolving the polyvinyl chloride aggregate particles. The polyvinyl chloride aggregate particles are dispersed in an organic solvent. It is possible to use alcohol-based solvents such as methanol, ketone-based solvents such as methyl ethyl ketone, ester-based solvents such as butoxyethyl acetate, aromatic-based solvents such as xylene, other hydrocarbon-based solvents, and the like as appropriate as such organic solvents, for example. The organic solvents may be used alone or in combination of two or more.

From the viewpoint of viscosity stability during cast molding and coating film forming properties, the composition for a metal can coating material preferably contains nonvolatile components including (A), (B), and (C) in a total amount of 20 wt % or more and 80 wt % or less, and more preferably contains nonvolatile components in a total amount of 25 wt % or more and 60 wt % or less.

The viscosity of the composition for a metal can coating material (sol) when the rotational speed is 6 rpm 24 hours after a sol is produced is preferably 100 mPa·s or more and 800 mPa·s or less, more preferably 300 mPa·s or more and 700 mPa·s or less, and even more preferably 350 mPa·s or more and 600 mPa·s or less. The viscosity of the composition for a metal can coating material (sol) when the rotational speed is 12 rpm 24 hours after a sol is produced is preferably 100 mPa·s or more and 800 mPa·s or less, more preferably 300 mPa·s or more and 700 mPa·s or less, and even more preferably 350 mPa·s or more and 600 mPa·s or less. The viscosity of the composition for a metal can coating material is measured using a Model B viscometer. When the viscosity of the composition for a metal can coating material is in the above-described range, the composition for a metal can coating material has low viscosity and good viscosity stability and thus can be suitably used for cast molding.

From the viewpoint of properties of forming a coating film through cast molding, the particle diameter (Method A) of the composition for a metal can coating material (sol) with which the amount of coarse particles remaining in the sol increases is preferably 20 µm or less, and more preferably 10 µm or less. The number of coarse particles (Method C) having a particle diameter of 80 µm or more and 100 µm or less is preferably two or less, and more preferably 1 or less.

A coating film (e.g., a film for a can inner surface) may be formed by coating a metal material with the composition for a metal can coating material (sol) and baking (cast molding) the composition, for example, although there is no particular limitation thereon. There is no particular limitation on the metal material, and for example, a tin plate, a tin-free steel, an aluminum material, or the like may be used. Coating may be performed using a known method such as roll coating, spray coating, dip coating gravure coating, curtain flow coating, brush coating, or printing. There is no particular limitation on baking, and from the viewpoint of the removability of an organic solvent and the reactivity of a curing reaction, baking may be performed at a temperature of 180° C., or more and 250° C., or less for 3 minutes or more and 20 minutes or less, or at a temperature of 190° C., or more and 240° C., or less for 3 minutes or more and 20 minutes or less, for example.

The coating film (e.g., a film for a can inner surface) preferably has a thickness of 0.2 µm or more and 100 µm or less. When the thickness of a coating film is in the above-described range, an organic solvent can be easily completely removed from the coating film, and the coating film is not damaged in a can forming process. The thickness of the coating film is more preferably 0.5 µm or more, even more preferably 1.0 µm or more, still more preferably 2.0 µm or more, and particularly preferably 3.0 µm or more. The thickness of the coating film is more preferably 50 µm or less, even more preferably 40 µm or less, still more preferably 30 µm or less, and particularly preferably 20 µm or less.

From the viewpoint of good transparency, the coating film (e.g., a film for a can inner surface) preferably has a haze value of 10.5% or less, more preferably has a haze value of 10.0% or less, and even more preferably has a haze value of 9.8% or less. From the viewpoint of good retort resistance, the gloss value of the coating film determined after the coating film is immersed in pure water for 90 minutes in an atmosphere of 0.26 MPa and 121° C., is preferably 50 or more, more preferably 60 or more, even more preferably 70 or more, and particularly preferably 75 or more. Also, from the viewpoint of good retort resistance, the gloss reduction value of the coating film resulting from the coating film being immersed in pure water for 90 minutes in an atmosphere of 0.26 MPa and 121° C., is preferably 45 or less, and more preferably 34 or less.

It is preferable that the coating film (e.g., a film for a can inner surface) has a thickness of 20 µm or less, has a haze value of 10.0% or less, and a gloss value of 50 or more, the gloss value being determined after the coating film is immersed in pure water for 90 minutes in an atmosphere of 0.26 MPa and 121° C. Because the coating film has good retort resistance even if the coating film is thin, the coating film can be suitably used as a film for a can inner surface of various metal cans such as oval cans, square cans, and DR cans.

Composition for Marking Film

A composition containing the polyvinyl chloride aggregate particles can be used as a composition for a marking film. A marking film made of the composition for a marking film has high transparency and water resistance.

From the viewpoint of the transparency water resistance, and weather resistance of a marking film, it is preferable that the composition for a marking film contains (a) the polyvinyl chloride aggregate particles in an amount of 50 parts by weight or more and 90 parts by weight or less, (b) a plasticizer in an amount of 10 parts by weight or more and 50 parts by weight or less, and (c) an organic solvent, and a total amount of (a) and (b) is 100 parts by weight.

The composition for a marking film more preferably contains (a) the polyvinyl chloride aggregate particles in an amount of 60 parts by weight or more and 80 parts by weight or less. The composition for a marking film more preferably contains (b) a plasticizer in an amount of 20 parts by weight or more and 40 parts by weight or less.

The composition for a marking film contains a plasticizer from the viewpoint of imparting flexibility to a marking film. There is no particular limitation on the plasticizer, and it is possible to use a plasticizer that is usually used in a polyvinyl chloride composition. Specifically, it is possible to use phthalic acid ester-based plasticizers such as di-2-ethylhexyl phthalate, di-n-octyl phthalate, dibutyl phthalate, diisononyl phthalate, and butylbenzyl phthalate; phosphoric acid ester-based plasticizers such as tricresyl phosphate and tri-2-ethylhexyl phosphate; adipic acid ester-based plasticizers such as di-2-ethylhexyl adipate; sebacic acid ester-based plasticizers such as di-2-ethylhexyl sebacate; azelaic acid ester-based plasticizers such as di-2-ethylhexyl azelate; trimellitic acid ester-based plasticizers such as tri-2-ethylhexyl trimellitate; polyester-based plasticizers; benzoic acid ester-based plasticizers such as di-2-ethylhexyl benzoate, diethylene glycol dibenzoate, 2,2,4-trimethyl-1,3-pentanediol isobutyrate benzoate; citric acid ester-based plasticizers such as acetyl tributyl citrate; glycolic acid ester-based plasticizers; chlorinated paraffin-based plasticizers; chlorinated fatty acid ester-based plasticizers; epoxy-based plasticizers; Texanol isobutyrate, and the like. The plasticizers may be used alone or in combination of two or more.

The composition for a marking film may further contain various additive agents that are usually used in a polyvinyl chloride composition, such as a stabilizer, an antistatic agent, a coloring agent, an ultraviolet absorbing material, a lubricant, a modifying agent, a filler, and a diluent as needed.

The (c) organic solvent (a volatile component) is used to reduce the viscosity of a marking film composition. The polyvinyl chloride aggregate particles are dispersed in an organic solvent. It is possible to use alcohol-based solvents such as methanol, ketone-based solvents such as methyl ethyl ketone, ester-based solvents such as butoxyethyl acetate, aromatic-based solvents such as xylene, other hydrocarbon-based solvents, and the like as appropriate as such organic solvents, for example. The organic solvents may be used alone or in combination of two or more.

From the viewpoint of viscosity stability and coating film forming properties, the composition for a marking film preferably contains nonvolatile components including (a) and (b) in a total amount of 10 wt % or more and 90 wt % or less, and more preferably contains nonvolatile components in a total amount of 15 wt % or more and 60 wt % or less.

The viscosity of the composition for a marking film (sol) when the rotational speed is 6 rpm 24 hours after a sol having low viscosity and viscosity-stable is produced is preferably 350 mPa·s or more and 8500 mPa·s or less, more preferably 400 mPa·s or more and 6000 mPa·s or less, and even more preferably 500 mPa·s or more and 1000 mPa·s or less. The viscosity of the composition for a marking film (sol) when the rotational speed is 12 rpm 24 hours after a sol having low viscosity and viscosity-stable is produced is preferably 300 mPa·s or more and 75000 mPa·s or less, more preferably 400 mPa·s or more and 5000 mPa·s or less, and even more preferably 500 mPa·s or more and 1000 mPa·s or less. The viscosity of the composition for a marking film is measured using a Model B viscometer. When the viscosity of the composition for a marking film is in the above-described range, the composition for a marking film has low viscosity and good viscosity stability, and thus can be suitably used for cast molding.

From the viewpoint of properties of forming a coating film through cast molding, the particle diameter (Method A) of the composition for a marking film (sol) with which the amount of coarse particles remaining in the sol increases is preferably μm or less, and more preferably 10 μm or less. Also, the number of coarse particles (Method C) having a particle diameter of 80 μm or more and 100 μm or less is preferably three or less, and more preferably 1 or less.

A marking film is formed by cast molding the composition for a marking film (sol), for example, although there is no particular limitation thereon. An example of the cast molding method is a method by which a coating film is obtained by applying the composition for a marking film (sol) with use of a gravure coater, a roll coater, a knife coater, a blade coater, a curtain coater, a dip coater, a spray coater, a spin coater, an extrusion coater, or a die coater, and hot-air drying the composition for a marking film, for example. Hot-air drying may be performed at a temperature of 180° C., or more and 250° C., or less for 3 minutes or more and 20 minutes or less, or at a temperature of 190° C., or more and 240° C., or less for 3 minutes or more and 20 minutes or less, for example.

The coating film (marking film) preferably has a thickness of 10 μm or more and 1000 μm or less. When the thickness of a marking film is in the above-described range, the marking film is unlikely to be damaged in use and can be prevented from being unnecessarily thick. The thickness of the coating film is more preferably 20 μm or more, and even more preferably 30 μm or more. The thickness of the marking film is more preferably 800 μm or less, even more preferably 500 μm or less, still more preferably 300 μm or less, and particularly preferably 200 μm or less.

From the viewpoint of good transparency, the marking film preferably has a haze value of 12.0% or less, more preferably has a haze value of 10.0% or less, and even more preferably has a haze value of 8.0% or less. From the viewpoint of good water resistance (whitening through water absorption), the marking film preferably has a haze value of 35.0% or less, more preferably has a haze value of 30.0% or less, and even more preferably has a haze value of 26.0% or less, the haze value being determined after the marking film is immersed in pure water at 30° C., for 3 days.

Also, from the viewpoint of good water resistance (recoverability), the marking film preferably has a haze value of 23.0% or less, and more preferably has a haze value of 20.0% or less, the haze value being determined after the marking film is immersed in pure water at 30° C., for 3 days and then is recovered at 23° C., and a relative humidity of 45% for 1 hour.

The marking film may be provided as it is, or may have an adhesive layer disposed on one surface of the marking film so as to be easily attached to an adherend such as an outdoor advertising billboard. An adhesive layer may be protected by forming a protecting layer by attaching a piece of release paper, a piece of mold release paper, a release film, a release liner, or the like to the adhesive layer.

The marking film may be suitably used for indoor and outdoor decorative displays, in particular, for outdoor decorative displays. Specifically, the marking film may be used as an outdoor advertising billboard, a sign display a wall covering sheet, or the like.

EXAMPLES

Although the present invention will be described below in detail based on examples the present invention is not limited to these examples.

First, measuring methods and evaluation methods used in examples and comparative examples will be described.

Volume Average Particle Diameter of Polyvinyl Chloride Latex Particles

A particle concentration gradient was created through centrifugation based on a sedimentation method, using, as a measurement sample, a polyvinyl chloride latex, and a disk centrifugal particle diameter distribution measuring apparatus ("Disk Centrifuge Model DC18000" manufactured by CPS Instruments, Inc.), and thus the volume average particle diameter (peak particle diameter) of polyvinyl chloride latex particles was determined from a volume-based weight distribution, in conformity with JIS Z8823-2. A sucrose concentration gradient was created by setting, as a measurement condition, the rotational speed of the disk to 12000 rpm, and injecting 8 mL of an 8 wt %-sucrose aqueous solution and 8 mL of a 24 wt %-sucrose aqueous solution. Measurement samples were prepared by adding an ion-exchanged water filtrated through a 0.2 μm-filter to a polyvinyl chloride latex filtrated through a 350-mesh wire net, and measurements were performed using a 470 nm-detector with 0.1 mL of a sample introduced.

Average Degree of Polymerization of Polyvinyl Chloride

The average degree of polymerization of a polyvinyl chloride was measured in conformity with JIS K 7367-2. First, a sample solution was produced by introducing, into a 100 mL-beaker, 2.5 mg of polyvinyl chloride aggregate particles or a dried polyvinyl chloride latex, and 50 mL (47.1 g) of cyclohexanone, and introducing the beaker into a shaker kept at 25° C., and dissolving the polyvinyl chloride aggregate particles or the dried polyvinyl chloride latex for 1 hour. Then, the averages (n=2) of drop seconds of the sample solution and cyclohexanone were obtained, and a viscosity ratio (VR)=drop seconds of sample solution/drop seconds of cyclohexanone was obtained. Then, a K value corresponding to the viscosity ratio (VR) was measured based on the conversion table of JIS K 7367-2-1999. Then, the average degree of polymerization was calculated based on the K value.

Glass Transition Temperature of Polyvinyl Chloride

A method for measuring a glass transition temperature Tg of a polyvinyl chloride involved weighing 5 mg of the polyvinyl chloride, placing the weighed polyvinyl chloride in an aluminum container, closing the lid thereof crimping the aluminum container, and setting the aluminum container and an empty aluminum container together with a standard substance in a differential scanning calorimeter (DSC7020 manufactured by Hitachi High-Tech Science Corporation), and Tg was calculated through differential scanning calorimetry in an nitrogen gas atmosphere in a range of 30° C., to 200° C., at a temperature increase rate of 10° C./min. Note that resins obtained by spray drying polyvinyl chloride latexes obtained in various production examples at an inlet temperature of 105° C., and an outlet temperature of 55° C., were used as samples of polyvinyl chlorides.

Particle Diameter Distribution of Polyvinyl Chloride Aggregate Particles

A particle diameter distribution of polyvinyl chloride aggregate particles was measured based on volume with use of MICROTRAC Model HRA9320-X100 (manufactured by NIKKISO CO., LTD.) that is a particle size distribution measuring apparatus, and a particle diameter (volume average particle diameter) D50 at a cumulative volume percentage of 50 vol % in the volume particle size distribution, and a particle diameter D90 at a cumulative volume percentage of 90 vol % in the volume particle size distribution were obtained. The measurement conditions were set such that the temperature was 25° C., and material information indicated that the material was transparent and had a refractive index of 1.51, spherical particles were not checked, and water was used as a carrier and the carrier had a refractive index of 1.33. Also, SET ZERO was 10 seconds, a measurement was performed for 10 seconds, and DRY CUT calculation was not performed.

Also, when a volume average particle diameter (D50) of the polyvinyl chloride latex particles constituting the polyvinyl chloride aggregate particles was measured, a measurement sample was prepared by adding 10 parts by weight of "NOIGEN LP-180" (manufactured by DKS Co. Ltd.) that is a nonionic surfactant to 100 parts by weight of polyvinyl chloride aggregate particles to dissolve the polyvinyl chloride aggregate particles in the polyvinyl chloride latex particles.

Na Concentration of Polyvinyl Chloride Aggregate Particles

Sample Water Extract

About 90 mg of a sample was weighed in a polypropylene (PP) container, 45 g of ultrapure water was added, ultrasonic treatment was performed at 40° C., for 1 hour; and the resulting mixture was stirred and shaken for 24 hours to extract Na. Then, a supernatant was collected and filtered through a hydrophilic polytetrafluoroethylene (PTFE) filter having a pore size of 0.2 µm to obtain a sample water extract. Note that the added ultrapure water was regarded as having a density of 1 g/mL, and a value (g) obtained by measuring the weight thereof was directly used as a volume (m).

ICP-MS Measurement

Semiquantitative analyses of Na included in the sample water extract were performed using a single point calibration curve method with use of Agilent7500CX manufactured by Agilent Technologies Japan, Ltd. Measurement conditions were set such that a qualitative/semiquantitative mode was used. RF power was 1500 W and a carrier gas was set at 0.85 L/min. Also, $H_2$ was used as a reaction gas under the condition of 5.0 mL/min, and He was used as a collision gas under the condition of 3.0 mL/min.

Viscosity

With regard to compositions (sols), sols obtained when 2 hours had passed and 1 day (24 hours) had passed after sols were produced were used as samples, and the viscosities of the sols were measured at rotational speeds of 6 rpm and 12 rpm with use of a Model B viscometer (Model BM ViS-COMETER manufactured by TOKIMEC INC.). The sol temperature was set to 25° C.

Coarse Particles

With regard to the compositions (sols), coarse particles remaining in the sols were measured using a grindometer, according to Method A and Method C (in a range of 80 µm or more and 100 µm or less). Note that Method A was used for a particle diameter size at which the amount of coarse particles increases, Method C was used for the number of particles present in various particle diameter ranges, and the number of coarse particles present in a range of 80 µm or more and 100 µm or less was obtained using Method C here.

Transparency of Film for can Inner Surface

Haze and total light transmittance of a film for a can inner surface (a film applied onto an OHP film) were measured using a turbidimeter (Haze Meter NDH4000 manufactured by NIPPON DENSHOKU INDUSTRIES CO., LTD.). Also, transparency was evaluated according to the following four levels of criteria based on haze values. The smaller the haze value is, the higher the transparency of a film is.

A: 9.8% or less
B: exceeding 9.8% and 10.5% or less
C: exceeding 10.5% and 15.0% or less
D: exceeding 15.0%

Retort Resistance

Retort Test

A film for a can inner surface (a film applied onto a tin plate) was immersed in pure water in an atmosphere of 0.26 MPa and 121° C., for 90 minutes.

Gloss of Film

The gloss of a film for a can inner surface before and after a retort test was measured. Note that the gloss of the film was measured using a glossmeter (GLOSS METER GM-3D manufactured by MURAKAMI COLOR RESEARCH LABORATORY) by measuring luminous intensity detected under the conditions that the difference between the incidence angle and the acceptance angle was 60° C. Retort resistance was evaluated according to the following four levels of criteria based on the amount of reduction in gloss after the retort test with respect to the gloss before the retort test. The lower the amount of reduction in gloss is, the better the retort resistance of a film is.

A: 34 or less
B: exceeding 34 and 45 or less
C: exceeding 45 and 80 or less
D: exceeding 80

Adhesiveness

After the retort test, the film for a can inner surface (the film applied onto the tin plate) was cut such that two squares with a side of 5 mm were vertically arranged side-by-side and four squares with a side of 5 mm were horizontally arranged side-by-side, and a separation test was performed using a cellophane tape (Sekisui cellophane tape (registered trademark) No. 252 manufactured by SEKISUI CHEMICAL CO., LTD.), and the number of separated square films was counted. Adhesiveness was evaluated according to the following three levels of criteria based on the number of separated square films. The lower the number of separated square films is, the better the adhesiveness of a film is.

A: zero
B: one
C: two or more

Transparency of Film for Marking

Haze of films for marking was measured using a turbidimeter (Haze Meter NDH4000 manufactured by NIPPON DENSHOKU INDUSTRIES CO., LTD.).

Transparency was evaluated according to the following four levels of criteria based on haze values. The smaller the haze value is, the higher the transparency of a film is.
A: 8.0% or less
B: exceeding 8.0% and 12.0% or less
C: exceeding 12.0% and 20.0% or less
D: exceeding 20.0%

Water Resistance

A water resistance test was performed by immersing a film for marking in pure water kept at 30° C., for 3 days. Haze of films for marking obtained immediately after the water resistance test (whitening through water absorption), and haze of films for marking obtained after the films were subjected to the water resistance test and were recovered at 23° C., and a relative humidity of 45% for 1 hour (recoverability) were measured using a turbidimeter (Haze Meter NDH4000 manufactured by NIPPON DENSHOKU INDUSTRIES CO., LTD.). Whitening through water absorption and recoverability were evaluated according to the following criteria based on haze values. The smaller the haze value is, the better the water resistance of a film is.

Whitening Through Water Absorption
A: 26% or less
B: exceeding 26% and 35% or less
C: exceeding 35% and 50% or less
D: exceeding 50%

Recoverability
A: 20% or less
B: exceeding 20% and 23% or less
C: exceeding 23% and 40% or less
D: exceeding 40%

Production Example 1

Polymerization was carried out by introducing, into a 300 L-pressure resistant vessel equipped with a jacket, 136.4 kg of a vinyl chloride monomer, 150 kg of ion-exchanged water, 16.7 g of sodium lauryl sulfate, 127.5 g of sodium hydroxymethanesulfinate dihydrate (Rongalite), and 60 g of sodium hydrogen carbonate, increasing the temperature to 50° C., and continuously adding 3.2 kg of a 0.3 wt % t-butyl hydroperoxide aqueous solution and 7.9 kg of a 4 wt % sodium lauryl sulfate aqueous solution while stirring the resulting mixture. A polyvinyl chloride latex was obtained by carrying out polymerization until the polymerization pressure was reduced by 0.35 MPa from the initial pressure (0.7 MPa) and collecting the remaining monomer. In the finally obtained polyvinyl chloride latex, the polymerization conversion rate of vinyl chloride monomer with respect to the total amount of the introduced vinyl chloride monomer was 90%. In the obtained polyvinyl chloride latex, the polyvinyl chloride latex particles had a volume average particle diameter of 0.45 μm, and the average degree of polymerization was 1480. The resin solid concentration in the polyvinyl chloride latex was 38 wt %.

Production Example 2

Polymerization was carried out by introducing, into a 300 L-pressure resistant vessel equipped with a jacket, 150 kg of a vinyl chloride monomer, 150 kg of ion-exchanged water, 14.6 kg of the polyvinyl chloride latex obtained in Production Example 1, 83.3 g (0.06 parts by weight with respect to 100 parts by weight of the total amount of the introduced vinyl chloride monomer) of a potassium myristate aqueous solution, 127.5 g of sodium hydroxymethanesulfinate dihydrate (Rongalite), and 15 g of potassium phosphate, increasing the temperature to 48° C., and continuously adding 5.44 kg of a 0.4 wt % t-butyl hydroperoxide aqueous solution and 6.8 kg (0.45 of parts by weight with respect to 100 parts by weight of the total amount of the introduced vinyl chloride monomer) of a 10 wt % potassium myristate aqueous solution while stirring the resulting mixture. A polyvinyl chloride latex was obtained by carrying out polymerization until the polymerization pressure was reduced by 0.3 MPa from the initial pressure (0.65 MPa) and collecting the remaining monomer. In the finally obtained polyvinyl chloride latex, the polymerization conversion rate of vinyl chloride monomer with respect to the total amount of the introduced vinyl chloride monomer was 90%. The obtained polyvinyl chloride latex contained polyvinyl chloride latex particles having a volume average particle diameter of 1.24 μm in an amount of 80 vol % and polyvinyl chloride latex particles having a volume average particle diameter of 0.45 μm in an amount of 20 vol %, and the average degree of polymerization of the polyvinyl chloride was 1640. The resin solid concentration in the polyvinyl chloride latex was 40 wt %, and Tg of the polyvinyl chloride was 80° C.

Production Example 3

Polymerization was carried out by introducing, into a 300 L-pressure resistant vessel equipped with a jacket, 150 kg of a vinyl chloride monomer, 150 kg of ion-exchanged water, 150 g of potassium myristate, 127.5 g of sodium hydroxymethanesulfinate dihydrate (Rongalite), and 15 g of potassium phosphate, increasing the temperature to 50° C., and continuously adding 3.2 kg of a 0.6 wt % t-butyl hydroperoxide aqueous solution and 7.9 kg of a 12 wt % potassium myristate aqueous solution while stirring the resulting mixture. A polyvinyl chloride latex was obtained by carrying out polymerization until the polymerization pressure was reduced by 0.35 MPa from the initial pressure (0.7 MPa) and collecting the remaining monomer. In the finally obtained polyvinyl chloride latex, the polymerization conversion rate of vinyl chloride monomer with respect to the total amount of the introduced vinyl chloride monomer was 90%. In the obtained polyvinyl chloride latex, the polyvinyl chloride latex particles had a volume average particle diameter of 0.27 μm, and the average degree of polymerization of the polyvinyl chloride was 1500. The resin solid concentration in the polyvinyl chloride latex was 46 wt %, and Tg of the polyvinyl chloride was 78° C.

Production Example 4

Polymerization was carried out by introducing, into a 300 L-pressure resistant vessel equipped with a jacket, 136.4 kg of a vinyl chloride monomer, 150 kg of ion-exchanged water, 4.0 kg of the polyvinyl chloride latex obtained in Production Example 3, 115.9 g of sodium hydroxymethanesulfinate dihydrate (Rongalite), and 13.6 g of potassium phosphate, increasing the temperature to 48° C., and continuously adding 2.94 kg of a 0.8 wt % t-butyl hydroperoxide aqueous solution and 6.8 kg (0.50 parts by weight with respect to 100 parts by weight of the total amount of the introduced vinyl chloride monomer) of a 10 wt % potassium myristate aqueous solution while stirring the resulting mixture. A polyvinyl chloride latex was obtained by carrying out polymerization until the polymerization pressure was reduced by 0.3 MPa from the initial pressure (0.65 MPa) and collecting the remaining monomer. In the finally obtained polyvinyl chloride latex, the polymerization conversion rate of vinyl chloride monomer with respect to the total amount of the introduced vinyl chloride monomer was 90%. In the obtained polyvinyl chloride latex, the polyvinyl chloride latex particles had a volume average particle diameter of 1.05 µm, and the average degree of polymerization of the polyvinyl chloride was 1620. The resin solid concentration in the polyvinyl chloride latex was 40 wt %, and Tg of the polyvinyl chloride was 79° C.

Production Example 5

Polymerization was carried out by introducing, into a 300 L-pressure resistant vessel equipped with a jacket, 150 kg of a vinyl chloride monomer, 150 kg of ion-exchanged water, 50 g of sodium lauryl sulfate, and 67.7 g of sodium hydroxymethanesulfinate dihydrate (Rongalite), increasing the temperature to 50° C., and continuously adding 3.2 kg of a 0.3 wt % hydrogen peroxide aqueous solution and 10.5 kg of an 8.6 wt % sodium lauryl sulfate aqueous solution while stirring the resulting mixture. A polyvinyl chloride latex was obtained by carrying out polymerization until the polymerization pressure was reduced by 0.35 MPa from the initial pressure (0.7 MPa) and collecting the remaining monomer. In the finally obtained polyvinyl chloride latex, the polymerization conversion rate of vinyl chloride monomer with respect to the total amount of the introduced vinyl chloride monomer was 92%. In the obtained polyvinyl chloride latex, the polyvinyl chloride latex particles had a volume average particle diameter of 0.37 µm, and the average degree of polymerization of the polyvinyl chloride was 1480. The resin solid concentration in the polyvinyl chloride latex was 46 wt %.

Production Example 6

150 kg of a vinyl chloride monomer, 150 kg of ion-exchanged water, 120 g of sodium sulfite, 4330 g of the polyvinyl chloride latex of Production Example 5, and 9.5 g of a 3.7 wt % copper-ammonia complex aqueous solution were added to a 300 L-pressure resistant vessel equipped with a jacket, and the temperature was increased to 46° C., and the resulting mixture was stirred. Then, polymerization was carried out by continuously adding 7.5 kg of a 0.5 wt % ammonium persulfate aqueous solution, 8.9 kg of an 8 wt % ammonium laurate aqueous solution, and 1.0 kg of a 3.7 wt % copper-ammonia complex aqueous solution. A polyvinyl chloride latex was obtained by carrying out polymerization until the polymerization pressure was reduced by 0.25 MPa from the initial pressure (0.6 MPa) and collecting the remaining monomer. In the finally obtained polyvinyl chloride latex, the polymerization conversion rate of vinyl chloride monomer with respect to the total amount of the introduced vinyl chloride monomer was 85%. The obtained polyvinyl chloride latex contained polyvinyl chloride latex particles having a volume average particle diameter of 1.00 µm in an amount of 70 vol % and polyvinyl chloride latex particles having a volume average particle diameter of 0.16 µm in an amount of 30 vol %, and the average degree of polymerization of the polyvinyl chloride was 1500. The resin solid concentration in the polyvinyl chloride latex was 40 wt %.

Production Example 7

Polymerization was carried out by introducing, into a 300 L-pressure resistant vessel equipped with a jacket, 150 kg of a vinyl chloride monomer 150 kg of ion-exchanged water, 21.2 kg of the polyvinyl chloride latex obtained in Production Example 1, 141 g (0.09 parts by weight with respect to 100 parts by weight of the total amount of the introduced vinyl chloride monomer) of potassium myristate, 127.5 g of sodium hydroxymethanesulfinate dihydrate (Rongalite), and 15.0 g of potassium phosphate, increasing the temperature to 46° C., and continuously adding 6.76 kg of a 0.34 wt % t-butyl hydroperoxide aqueous solution and 4.03 kg (0.27 parts by weight with respect to 100 parts by weight of the total amount of the introduced vinyl chloride monomer) of a 10 wt % potassium myristate aqueous solution while stirring the resulting mixture. A polyvinyl chloride latex was obtained by carrying out polymerization until the polymerization pressure was reduced by 0.3 MPa from the initial pressure (0.60 MPa) and collecting the remaining monomer. In the finally obtained polyvinyl chloride latex, the polymerization conversion rate of vinyl chloride monomer with respect to the total amount of the introduced vinyl chloride monomer was 90%. The obtained polyvinyl chloride latex contained polyvinyl chloride latex particles having a volume average particle diameter of 1.05 µm in an amount of 70 vol % and polyvinyl chloride latex particles having a volume average particle diameter of 0.38 µm in an amount of 30 vol %, and the average degree of polymerization of the polyvinyl chloride was 1780. The resin solid concentration in the polyvinyl chloride latex was 44 wt %, and Tg of the polyvinyl chloride was 80° C.

Production Example 8

Polymerization was carried out by introducing, into a 300 L-pressure resistant vessel equipped with a jacket, 150 kg of a vinyl chloride monomer, 150 kg of ion-exchanged water, 21.2 kg of the polyvinyl chloride latex obtained in Production Example 1, 141 g (0.09 parts by weight with respect to 100 parts by weight of the total amount of the introduced vinyl chloride monomer) of potassium myristate, 127.5 g of sodium hydroxymethanesulfinate dihydrate (Rongalite), and 15.0 g of potassium phosphate, increasing the temperature to 42° C., and continuously adding 6.76 kg of a 0.34 wt % t-butyl hydroperoxide aqueous solution and 4.03 kg (0.27 parts by weight with respect to 100 parts by weight of the total amount of the introduced vinyl chloride monomer) of a 10 wt % potassium myristate aqueous solution while stirring the resulting mixture. A polyvinyl chloride latex was obtained by carrying out polymerization until the polymerization pressure was reduced by 0.3 MPa from the initial pressure (0.60 MPa) and collecting the remaining monomer. In the finally obtained polyvinyl chloride latex, the polymerization conversion rate of vinyl chloride monomer with respect to the total amount of the introduced vinyl chloride monomer was 90%. The obtained polyvinyl chloride latex contained polyvinyl chloride latex particles having a volume average particle diameter of 1.05 µm in an amount of 70 vol % and polyvinyl chloride latex particles having a volume average particle diameter of 0.36 µm in an amount of 30 vol %, and the average degree of polymerization of the polyvinyl chloride was 2200. The resin solid concentration in the polyvinyl chloride latex was 44 wt %, and Tg of the polyvinyl chloride was 82° C.

Example 1

10.7 kg of pure water was introduced into a mixer (heat treatment tank) equipped with a stirrer, water vapor was then mixed, and the mixer was kept at 80° C.

Separately, pure water was added to 18.2 kg of the polyvinyl chloride latex obtained in Production Example 2 such that the resin solid concentration in the latex was 24.5 wt %, and the temperature thereof was adjusted to 40° C. Also, a 10 wt % sulfuric acid aqueous solution and a polyvinyl chloride latex were mixed such that the amount of blended sulfuric acid was 1 part by weight with respect to 100 parts by weight of the resin solids of the polyvinyl chloride latex, the resulting mixture was stirred using a "VIBRO MIXER" manufactured by REICA Co., Ltd, under a strong shearing force of 5 kW/m$^3$ or more, and the obtained coagulated latex of the polyvinyl chloride was continuously introduced into an 80° C., water bath disposed in the above-described heat treatment tank, and heat treatment was performed while stirring at 80° C., for 30 minutes.

Because the pH of the slurry containing the polyvinyl chloride aggregate particles (also simply referred to as aggregate particles hereinafter) obtained after the heat treatment ended was 2.5, a 5 wt % sodium hydroxide aqueous solution was used to adjust the pH of the slurry containing aggregate particles to 7, and the slurry containing aggregate particles was then discharged from the heat treatment tank.

Then, the slurry containing aggregate particles was dehydrated through filtration, and the dehydrated slurry was washed with an amount of pure water that was 30 times the weight of the resin solids (wet resin) (also referred to as a "washing multiple" hereinafter), and then the resulting slurry was dehydrated through filtration again. The obtained wet resin was dried for 48 hours by placing the wet resin in a constant-temperature dryer (Model DX402 handled by Yamato Scientific Co., Ltd.) set at 60° C., to obtain a dry powder. Then, the obtained dry powder was crushed using a fluidized bed jet mill crusher CGS-10 manufactured by NETZSCH-CONDUX at room temperature (20±5° C.), a crushing pressure of 0.55 MPa, and a classification rotational speed of 12000 rpm to obtain crushed particles (aggregate particles). The aggregate particles of Example 1 were aggregates of polyvinyl chloride latex particles having a volume average particle diameter of 1.24 μm in an amount of 80 vol % and polyvinyl chloride latex particles having a volume average particle diameter of 0.45 μm in an amount of 20 vol %.

Example 2

Crushed particles (aggregate particles) were obtained in a manner similar to that of Example 1, except that the heat treatment temperature was changed to 85° C. The aggregate particles of Example 2 were aggregates of polyvinyl chloride latex particles having a volume average particle diameter of 1.24 μm in an amount of 80 vol % and polyvinyl chloride latex particles having an average particle diameter of 0.45 μm in an amount of 20 vol %.

Example 3

Crushed particles (aggregate particles) were obtained in a manner similar to that of Example 1, except that the heat treatment temperature was changed to 90° C. The aggregate particles of Example 3 were aggregates of polyvinyl chloride latex particles having a volume average particle diameter of 1.24 μm in an amount of 80 vol % and polyvinyl chloride latex particles having an average particle diameter of 0.45 μm in an amount of 20 vol %.

Example 4

Crushed particles (aggregate particles) were obtained in a manner similar to that of Example 1, except that a latex obtained by mixing together 3.6 kg of the polyvinyl chloride latex obtained in Production Example 3 and 14.5 kg of the polyvinyl chloride latex obtained in Production Example 4 and stirring the resulting mixture was used as a polyvinyl chloride latex. The aggregate particles of Example 4 were aggregates of polyvinyl chloride latex particles having a volume average particle diameter of 1.05 μm in an amount of 80 vol % and polyvinyl chloride latex particles having a volume average particle diameter of 0.27 μm in an amount of 20 vol %.

Example 5

Crushed particles (aggregate particles) were obtained in a manner similar to that of Example 1, except that the classification rotational speed during crushing was changed to 2000 rpm. The aggregate particles of Example 5 were aggregates of polyvinyl chloride latex particles having a volume average particle diameter of 1.24 μm in an amount of 80 vol % and polyvinyl chloride latex particles having an average particle diameter of 0.45 μm in an amount of 20 vol %.

Example 6

Crushed particles (aggregate particles) were obtained in a manner similar to that of Example 1, except that washing was performed using an amount of pure water that was 20 times the weight of a wet resin, and crushing was performed using a mortar and pestle. The aggregate particles of Example 6 were aggregates of polyvinyl chloride latex particles having a volume average particle diameter of 1.24 μm in an amount of 80 vol % and polyvinyl chloride latex particles having an average particle diameter of 0.45 μm in an amount of 20 vol %.

Example 7

Crushed particles (aggregate particles) were obtained in a manner similar to that of Example 1, except that washing was performed using an amount of pure water that was 5 times the weight of a wet resin, and crushing was performed using a mortar and pestle. The aggregate particles of Example 7 were aggregates of polyvinyl chloride latex particles having a volume average particle diameter of 1.24 μm in an amount of 80 vol % and polyvinyl chloride latex particles having an average particle diameter of 0.45 μm in an amount of 20 vol %.

Example 8

Crushed particles (aggregate particles) were obtained in a manner similar to that of Example 1, except that washing was performed using an amount of pure water that was 2 times the weight of a wet resin, and crushing was performed using a mortar and pestle. The aggregate particles of Example 8 were aggregates of polyvinyl chloride latex particles having a volume average particle diameter of 1.24 μm in an amount of 80 vol % and polyvinyl chloride latex particles having an average particle diameter of 0.45 μm in an amount of 20 vol %.

Example 9

Crushed particles (aggregate particles) were obtained in a manner similar to that of Example 1, except that 18.2 kg of the polyvinyl chloride latex obtained in Example 4 was used as a polyvinyl chloride latex, and the classification rotational speed of crushing was changed to 9500 rpm. The aggregate particles of Example 9 were aggregates of polyvinyl chloride latex particles having a volume average particle diameter of 1.05 μm.

Example 10

Crushed particles (aggregate particles) were obtained in a manner similar to that of Example 1, except that the polyvinyl chloride latex obtained in Production Example 7 was used as a polyvinyl chloride latex, washing was performed using an amount of water that was 2 times the weight of a wet resin, and crushing was performed using a mortar and pestle. The aggregate particles of Example 10 were aggregates of polyvinyl chloride latex particles having a volume average particle diameter of 1.05 μm in an amount of 70 vol % and polyvinyl chloride latex particles having an average particle diameter of 0.38 μm in an amount of 30 vol %.

Example 11

Crushed particles (aggregate particles) were obtained in a manner similar to that of Example 1, except that a latex obtained by mixing together 9.0 kg of the polyvinyl chloride latex obtained in Production Example 3 and 9.0 kg of the polyvinyl chloride latex obtained in Production Example 4 and stirring the resulting mixture was used as a polyvinyl chloride latex, washing was performed using an amount of water that was 2 times the weight of a wet resin, and crushing was performed using a mortar and pestle. The aggregate particles of Example 11 were aggregates of polyvinyl chloride latex particles having a volume average particle diameter of 1.05 μm in an amount of 50 vol % and polyvinyl chloride latex particles having a volume average particle diameter of 0.27 μm in an amount of 50 vol %.

Example 12

Crushed particles (aggregate particles) were obtained in a manner similar to that of Example 1, except that the heat treatment temperature was changed to 95° C. The aggregate particles of Example 12 were aggregates of polyvinyl chloride latex particles having a volume average particle diameter of 1.24 μm in an amount of 80 vol % and polyvinyl chloride latex particles having a volume average particle diameter of 0.45 μm in an amount of 20 vol %.

Example 13

Crushed particles (aggregate particles) were obtained in a manner similar to that of Example 3, except that the polyvinyl chloride latex obtained in Production Example 8 was used as a polyvinyl chloride latex, and crushing was performed using a mortar and pestle. The aggregate particles of Example 13 were aggregates of polyvinyl chloride latex particles having a volume average particle diameter of 1.05 μm in an amount of 70 vol % and polyvinyl chloride latex particles having a volume average particle diameter of 0.36 μm in an amount of 30 vol %.

Comparative Example 1

Crushed particles (aggregate particles) were obtained in a manner similar to that of Working Example 4, except that a dry powder was crushed using a hammer mill equipped with a classifier (ACM-10) manufactured by Hosokawa Micron Group, at room temperature, a crushing rotational speed of 3750 rpm, and a classification rotational speed of 7000 rpm.

Comparative Example 2

Crushed particles (aggregate particles) were obtained in a manner similar to that of Comparative Example 1, except that a slurry containing polyvinyl chloride aggregate particles was washed through addition of an amount of pure water that was times the weight of a wet resin.

Comparative Example 3

Crushed particles (aggregate particles) were obtained in a manner similar to that of Comparative Example 1, except that the obtained dry powder was crushed using a bantam mill manufactured by Hosokawa Micron Group, at a rotational speed of 60 Hz.

Comparative Example 4

Crushed particles were obtained by drying 20 kg of the polyvinyl chloride latex obtained in Production Example 2, through spray drying with a two-fluid nozzle under the conditions that the inlet had a temperature of 105° C., and the outlet had a temperature of 50° C., and crushing the obtained dried particles with use of a bantam mill manufactured by Hosokawa Micron Group at a rotational speed of 60 Hz.

Comparative Example 5

Crushed particles were obtained by drying 20 kg of the polyvinyl chloride latex obtained in Production Example 6, through spray drying with a two-fluid nozzle under the conditions that the inlet had a temperature of 105° C., and the outlet had a temperature of 50° C., and crushing the obtained dried particles with use of a bantam mill manufactured by Hosokawa Micron Group at a rotational speed of 60 Hz.

Comparative Example 6

Crushed particles (aggregate particles) were obtained in a manner similar to that of Comparative Example 1, except that 18.2 kg of the polyvinyl chloride latex obtained in Production Example 4 was used.

Comparative Example 7

Geon178 (Tg: 81° C.) that is a vinyl chloride homopolymer and is manufactured by Polyone was used. The vinyl chloride homopolymer was an aggregate of polyvinyl chloride latex particles having a volume average particle diameter of 1.05 μm in an amount of 70 vol % and polyvinyl chloride latex particles having an average particle diameter of 0.30 μm in an amount of 30 vol %.

Example A1

Production of Composition for can Inner Surface Coating Material 53.5 parts by weight of a polyester-based resin (VYLON (registered trademark) 103 manufactured by TOYOBO CO., LTD.), 16.7 parts by weight of a phenolic resin (RESITOP (registered trademark) PL-4329 manufactured by Gunei Chemical Industry Co., Ltd.), 16.7 g parts by weight of an epoxy resin (JER (registered trademark) 828 manufactured by Mitsubishi Chemical Corporation), 5.6 parts by weight of methyl ethyl ketone, 62.4 parts by weight of xylene, 62.4 parts by weight of butoxyethyl acetate, and 49.5 parts by weight of a hydrocarbon-based solvent (SOLVESSO 150 manufactured by Esso Standard) were added to 100 parts by weight of the crushed particles (aggregate particles) obtained in Example 1, and the resulting mixture was kneaded using a dissolver-type kneader "ROBO MICS/TOKU SHU manufactured by KIKA" twice at 2000 rpm for 2 minutes to obtain a coating composition for a can inner surface.

Production of Film for can Inner Surface

The coating composition for a can inner surface obtained as described above was applied using a roll coater onto a tin metal plate (a tine plate made of JFE Steel Corporation) and onto an OHP film such that the dried composition had a thickness of μm, and was baked at 200° C., for 5 minutes to obtain films for a can inner surface.

Examples A2 to A8, and A10 to A13

Coating compositions for a can inner surface and films for a can inner surface were obtained in a manner similar to that of Example A1, except that 100 parts by weight of the crushed particles (aggregate particles) obtained in Examples 2 to 8, and to 13 were respectively used instead of the crushed particles (aggregate particles) obtained in Example 1.

Example A9

A coating composition for a can inner surface was obtained in a manner similar to that of Example A1, except that 100 parts by weight of the crushed particles (aggregate particles) obtained in Example 9 were used instead of the crushed particles (aggregate particles) obtained in Example 1. Also, films for a can inner surface were obtained in a manner similar to that of Example A1, except that the dried composition had a thickness of 100 μm.

Comparative Examples A1 to A6

Coating compositions for a can inner surface and films for a can inner surface were obtained in a manner similar to that of Example A1, except that 100 parts by weight of the crushed particles obtained in Comparative Examples 1 to 5 and the polyvinyl chloride particles of Comparative Example 7 were respectively used instead of the crushed particles (aggregate particles) obtained in Example 1.

Comparative Examples A7 and A8

Coating compositions for a can inner surface were obtained in a manner similar to that of Example A1, except that 100 parts by weight of the crushed particles obtained in Comparative Example 6 and the polyvinyl chloride particles of Comparative Example 7 were respectively used instead of the crushed particles (aggregate particles) obtained in Example 1. Also, films for a can inner surface were obtained in a manner similar to that of Example A1, except that the dried composition had a thickness of 100 μm.

Example B1

Composition for Marking Film parts by weight of a polyester-based plasticizer (ADEKA CIZER PN-280 manufactured by ADEKA), 3 parts by weight of a Ba/Zn PVC stabilizer (ADEKA STABAC323 manufactured by ADEKA), and 30 parts by weight of a hydrocarbon-based solvent (SOLVESSO 150 manufactured by Esso Standard) were added to 100 parts by weight of the crushed particles (aggregate particles) obtained in Example 1, the resulting mixture was preliminarily kneaded using a dissolver-type kneader "ROBO MICS/TOKU SHU manufactured by KIKA" at 350 rpm for 1 minute and then at 2000 rpm for 2 minutes 30 parts by weight of diisobutyl ketone were added, and the resulting mixture was further kneaded at 2000 rpm for 2 minutes to obtain a composition for a marking film.

Production of Marking Film

The composition for a marking film obtained as described above was applied using a roll coater onto an OHP film such that the dried composition had a thickness of 50 μm, and was dried at 200° C., for 5 minutes to obtain a marking film.

Examples B2 to B8, B10, B11, and B13

Compositions for a marking film and marking films were obtained in a manner similar to that of Example B1, except that 100 parts by weight of the crushed particles (aggregate particles) obtained in Examples 2 to 8, 10, 11, and 13 were respectively used instead of the crushed particles (aggregate particles) obtained in Example 1.

Examples B9 and B12

Compositions for a marking film were obtained in a manner similar to that of Example B1, except that 100 parts by weight of the crushed particles (aggregate particles) obtained in Examples 9 and 12 were respectively used instead of the crushed particles (aggregate particles) obtained in Example 1. Also, marking films were obtained in a manner similar to that of Example B1, except that the dried composition had a thickness of 100 μm.

Comparative Examples B1 to B4

Compositions for a marking film and marking films were obtained in a manner similar to that of Example B1, except that 100 parts by weight of the crushed particles obtained in Comparative Examples 1, 3, and 4 and the polyvinyl chloride particles of Comparative Example 7 were respectively used instead of the crushed particles (aggregate particles) obtained in Example 1.

Comparative Examples B5 and B6

Compositions for a marking film were obtained in a manner similar to that of Example B1, except that 100 parts by weight of the crushed particles obtained in Comparative Example 6 and the polyvinyl chloride particles of Comparative Example 7 were respectively used instead of the crushed particles (aggregate particles) obtained in Example 1. Also, marking films were obtained in a manner similar to that of Example B1, except that the dried composition had a thickness of 100 μm.

Average particle diameters (latex particles), the average degree of polymerization, and glass transition temperatures of the polyvinyl chlorides in the polyvinyl chloride latexes obtained in Production Examples 1 to 6 were measured and calculated as described above, and the results thereof are shown in Table 1 below.

D50 and D90 of the crushed particles obtained in Examples 1 to 13 and Comparative Examples 1 to 7 were measured and calculated as described above, and the results thereof are shown in Table 2 and Table 3 below. The Na concentrations of the crushed particles obtained in Examples 1 to 13 and Comparative Examples 1 to 7 were measured and calculated as described above, and the results thereof are shown in Table 2 and Table 3 below.

The viscosities of the coating compositions for a can inner surface (sols) obtained in Examples A1 to A13 and Comparative Examples A1 to A8, and the compositions for a marking film (sols) obtained in Examples B1 to B13 and Comparative Examples B1 to B6 (V6 indicates the viscosity when the rotational speed was 6 rpm, and V12 indicates the viscosity when the rotational speed was 12 rpm), and the numbers of coarse particles thereof were measured as described above, and the results thereof are shown in Table 2 and Table 3 below.

With regard to the films for a can inner surface obtained in Examples Alto A13 and Comparative Examples A1 to A8, transparency total light transmittance, and retort resistance (gloss and adhesiveness after a retort test) were measured and evaluated as described above, and the results thereof are shown in Table 2 and Table 3 below.

With regard to the films for marking obtained in Examples B1 to B13 and Comparative Examples B1 to B6, transparency and water resistance (whitening through water absorption and recoverability) were measured and evaluated as described above, and the results thereof are shown in Table 2 and Table 3 below.

TABLE 1

| | Polyvinyl chloride | | | |
|---|---|---|---|---|
| | Polymerization | Volume average particle diameter (latex particles) | Average degree of polymerization | Glass transition temperature |
| Production Example 1 | Emulsion polymerization | 0.45 | 1480 | — |
| Production Example 2 | Seeded emulsion polymerization | 1.24/0.45 (μm) = 80/20 (vol %) | 1640 | 80° C. |
| Production Example 3 | Emulsion polymerization | 0.27 | 1500 | 78° C. |
| Production Example 4 | Seeded emulsion polymerization | 1.05 | 1620 | 79° C. |
| Production Example 5 | Emulsion polymerization | 0.37 | 1480 | — |
| Production Example 6 | Seeded emulsion polymerization | 1.00/0.16 (μm) = 70/30 (vol %) | 1500 | — |
| Production Example 7 | Seeded emulsion polymerization | 1.05/0.38 (μm) = 70/30 (vol %) | 1780 | 80° C. |
| Production Example 8 | Seeded emulsion polymerization | 1.05/0.36 (μm) = 70/30 (vol %) | 2200 | 82° C. |

TABLE 2

| Examples | | | 1 | 2 | 3 | 4 | 5 | 6 | 7 |
|---|---|---|---|---|---|---|---|---|---|
| Polyvinyl chloride aggregate particles | Polyvinyl chloride (latex) (wt %) | Production Example 2 | 100 | 100 | 100 | | 100 | 100 | 100 |
| | | Production Example 3 | | | | 20 | | | |
| | | Production Example 4 | | | | 80 | | | |
| | | Production Example 7 | | | | | | | |
| | | Production Example 8 | | | | | | | |
| Coagulating agent | | | | | | sulfaric acid | | | |
| Heat treatment temperature (° C.) | | | 80 | 85 | 90 | 80 | 80 | 80 | 80 |
| Washing (times) | | | 30 | 30 | 30 | 30 | 30 | 20 | 5 |
| Particle diameter (μm) | D50 | | 1.38 | 1.66 | 2.27 | 1.76 | 3.48 | 1.76 | 2.26 |
| | D90 | | 3.74 | 3.64 | 6.13 | 4.23 | 7.98 | 6.57 | 7.40 |
| Na concentration (ppm) | | | 45 | 45 | 45 | 50 | 45 | 50 | 60 |

| Examples | | | 8 | 9 | 10 | 11 | 12 | 13 |
|---|---|---|---|---|---|---|---|---|
| Polyvinyl chloride aggregate particles | Polyvinyl chloride (latex) (wt %) | Production Example 2 | 100 | | | | 100 | |
| | | Production Example 3 | | | | 50 | | |
| | | Production Example 4 | | 100 | | 50 | | |
| | | Production Example 7 | | | 100 | | | |
| | | Production Example 8 | | | | | | 100 |
| Coagulating agent | | | | | | | | |
| Heat treatment temperature (° C.) | | | 80 | 80 | 80 | 80 | 95 | 90 |
| Washing (times) | | | 2 | 30 | 2 | 2 | 2 | 2 |
| Particle diameter (μm) | D50 | | 2.49 | 2.50 | 2.63 | 3.26 | 2.75 | 2.43 |
| | D90 | | 5.96 | 4.18 | 6.84 | 7.81 | 6.95 | 7.03 |
| Na concentration (ppm) | | | 85 | 45 | 60 | 65 | 45 | 45 |

TABLE 2-continued

| | | | | Examples | A1 | A2 | A3 | A4 | A5 | A6 | A7 |
|---|---|---|---|---|---|---|---|---|---|---|---|
| Coating material composition for can inner surface | Viscosity (mPa·s) | After 2 hrs | V6 | | 400 | 480 | 500 | 460 | 390 | 380 | 350 |
| | | | V12 | | 430 | 460 | 480 | 450 | 380 | 370 | 350 |
| | | After 1 day | V6 | | 450 | 510 | 530 | 500 | 400 | 390 | 360 |
| | | | V12 | | 480 | 500 | 510 | 470 | 400 | 390 | 350 |
| | Coarse particles | Method A | (μm) | | 4 | 4 | 7 | 4 | 18 | 9 | 15 |
| | | Method C | Number | | 1 | 1 | 0 | 1 | 0 | 1 | 1 |
| Film for can inner surface | Thickness (μm) | | | | 20 | 20 | 20 | 20 | 20 | 20 | 20 |
| | Transparency | Haze (%) | | | 9.7 | 9.4 | 9.8 | 9.4 | 9.9 | 9.7 | 9.7 |
| | | Total light transmittance (%) | | | 97 | 97 | 96 | 97 | 95 | 96 | 95 |
| | | Evaluation | | | A | A | A | A | B | A | A |
| | Retort resistance | Adhesiveness | Number of separated squares | | 0 | 0 | 0 | 0 | 0 | 0 | 0 |
| | | | Evaluation | | A | A | A | A | A | A | A |
| | | Gloss | Before retort test | | 125.4 | 116.8 | 110.5 | 113.2 | 107.7 | 117.2 | 111.6 |
| | | | After retort test | | 98.1 | 86.5 | 78.9 | 82.5 | 70.1 | 86.3 | 76.1 |
| | | | Amount of reduction | | 27.3 | 30.3 | 31.6 | 30.7 | 37.6 | 30.9 | 35.5 |
| | | | Evaluation | | A | A | A | A | B | A | B |

| | | | | Examples | A8 | A9 | A10 | A11 | A12 | A13 |
|---|---|---|---|---|---|---|---|---|---|---|
| Coating material composition for can inner surface | Viscosity (mPa·s) | After 2 hrs | V6 | | 380 | 460 | 370 | 560 | 630 | 490 |
| | | | V12 | | 380 | 470 | 370 | 550 | 600 | 480 |
| | | After 1 day | V6 | | 400 | 480 | 370 | 580 | 650 | 520 |
| | | | V12 | | 400 | 480 | 370 | 570 | 620 | 510 |
| | Coarse particles | Method A | (μm) | | 8 | 7 | 10 | 17 | 12 | 8 |
| | | Method C | Number | | 0 | 1 | 0 | 2 | 0 | 1 |
| Film for can inner surface | Thickness (μm) | | | | 20 | 100 | 20 | 20 | 20 | 20 |
| | Transparency | Haze (%) | | | 9.7 | 9.8 | 9.7 | 9.8 | 10.1 | 9.8 |
| | | Total light transmittance (%) | | | 97 | 96 | 97 | 96 | 96 | 96 |
| | | Evaluation | | | A | A | A | A | B | B |
| | Retort resistance | Adhesiveness | Number of separated squares | | 0 | 0 | 0 | 0 | 0 | 0 |
| | | | Evaluation | | A | A | A | A | A | A |
| | | Gloss | Before retort test | | 118.0 | 100.2 | 112.1 | 106.6 | 107.5 | 108.4 |
| | | | After retort test | | 81.1 | 60.4 | 83.5 | 72.8 | 73.2 | 75.8 |
| | | | Amount of reduction | | 36.9 | 39.8 | 28.6 | 33.8 | 34.3 | 32.6 |
| | | | Evaluation | | B | B | A | A | B | A |

| | | | | Examples | B1 | B2 | B3 | B4 | B5 | B6 | B7 |
|---|---|---|---|---|---|---|---|---|---|---|---|
| Composition for marking film | Viscosity (mPa·s) | After 2 hrs | V6 | | 750 | 2150 | 4400 | 700 | 630 | 590 | 550 |
| | | | V12 | | 550 | 1000 | 3500 | 660 | 580 | 530 | 520 |
| | | After 1 day | V6 | | 900 | 2750 | 5200 | 770 | 690 | 650 | 600 |
| | | | V12 | | 800 | 1350 | 4000 | 720 | 610 | 610 | 550 |
| | Coarse particles | Method A | (μm) | | 6 | 8 | 10 | 5 | 16 | 14 | 19 |
| | | Method C | Number | | 1 | 2 | 1 | 1 | 2 | 2 | 3 |
| Marking film | Thickness (μm) | | | | 50 | 50 | 50 | 50 | 50 | 50 | 50 |
| | Transparency | Haze (%) | | | 7.0 | 6.9 | 7.1 | 7.1 | 6.7 | 6.9 | 7.0 |
| | | Evaluation | | | A | A | A | A | A | A | A |
| | Water resistance | Whitening through water absorption | Haze (%) | | 23.3 | 23.5 | 24.5 | 22.8 | 25.3 | 25.9 | 26.4 |
| | | | Evaluation | | A | A | A | A | A | A | B |
| | | Recoverability | Haze (%) | | 18.1 | 18.4 | 18.8 | 18.3 | 19.2 | 19.4 | 19.7 |
| | | | Evaluation | | A | A | A | A | A | A | A |

| | | | | Examples | B8 | B9 | B10 | B11 | B12 | B13 |
|---|---|---|---|---|---|---|---|---|---|---|
| Composition for marking film | Viscosity (mPa·s) | After 2 hrs | V6 | | 610 | 430 | 580 | 850 | 7300 | 2000 |
| | | | V12 | | 550 | 310 | 510 | 820 | 6500 | 1200 |
| | | After 1 day | V6 | | 660 | 680 | 620 | 900 | 8400 | 2600 |
| | | | V12 | | 600 | 520 | 540 | 860 | 7200 | 1700 |
| | Coarse particles | Method A | (μm) | | 9 | 7 | 14 | 18 | 13 | 9 |
| | | Method C | Number | | 1 | 0 | 1 | 1 | 0 | 1 |
| Marking film | Thickness (μm) | | | | 50 | 100 | 50 | 50 | 100 | 50 |
| | Transparency | Haze (%) | | | 6.8 | 10.5 | 6.6 | 7.0 | 9.6 | 7.3 |
| | | Evaluation | | | A | B | A | A | B | A |
| | Water resistance | Whitening through water absorption | Haze (%) | | 25.2 | 34.6 | 24.1 | 22.4 | 32.6 | 24.7 |
| | | | Evaluation | | A | B | A | A | B | A |

TABLE 2-continued

| | | | | | | | |
|---|---|---|---|---|---|---|---|
| Recoverability | Haze (%) | 19.5 | 20.4 | 18.7 | 17.9 | 20.1 | 19.1 |
| | Evaluation | A | B | A | A | B | A |

TABLE 3

| | | Comparative Examples | 1 | 2 | 3 | 4 | 5 | 7 | 6 | 7 |
|---|---|---|---|---|---|---|---|---|---|---|
| Polyvinyl chloride aggregate particles | Polyvinyl chloride (latex) (wt %) | Production Example 2 | | | | 100 | | | | |
| | | Production Example 3 | 20 | 20 | 20 | | | | | |
| | | Production Example 4 | 80 | 80 | 80 | | | | 100 | |
| | | Production Example 6 | | | | | 100 | | | |
| | Coagulating agent | | sulfuric acid | sulfuric acid | sulfuric acid | none | none | | sulfuric acid | |
| | Heat treatment temperature (° C.) | | 80 | 80 | 80 | none | none | | 80 | |
| | Washing (times) | | 30 | 20 | 30 | none | none | | 30 | |
| | Particle diameter (μm) | D50 | 9.79 | 5.90 | 11.0 | 2.84 | 4.31 | 2.63 | 9.12 | 2.63 |
| | | D90 | 21.0 | 19.5 | 37.0 | 7.05 | 15.0 | 8.50 | 16.20 | 8.50 |
| | Na concentration (ppm) | | 50 | 50 | 50 | 300 | 100 | 100 | 45 | 100 |

| | | Comparative Examples | A1 | A2 | A3 | A4 | A5 | A6 | A7 | A8 |
|---|---|---|---|---|---|---|---|---|---|---|
| Coating material composition for can inner surface | Viscosity (mPa · s) | After 2 hrs V6 | 420 | 440 | 370 | 420 | 600 | 430 | 450 | 430 |
| | | V12 | 550 | 460 | 370 | 410 | 530 | 430 | 460 | 430 |
| | | After 1 day later V6 | 540 | 510 | 480 | 440 | 610 | 450 | 470 | 450 |
| | | V12 | 560 | 500 | 470 | 430 | 530 | 450 | 470 | 450 |
| | Coarse particles | Method A (μm) | 53 | 47 | 78 | 14 | 35 | 26 | 46 | 26 |
| | | Method C Number | 2 | 2 | 16 | 2 | 1 | 1 | 1 | 1 |
| Film for can inner surface | Thickness (μm) | | 20 | 20 | 20 | 20 | 20 | 20 | 100 | 100 |
| | Transparency | Haze (%) | 14.5 | 13.6 | 53.8 | 10.1 | 11.0 | 9.5 | 13.2 | 10.3 |
| | | Total light transmittance (%) | 97 | 96 | 72 | 94 | 90 | 96 | 96 | 96 |
| | | Evaluation | C | C | D | B | C | A | C | B |
| | Retort resistance | Adhesiveness Number of separated squares | 0 | 0 | 3 | 3 | 4 | 0 | 0 | 0 |
| | | Evaluation | A | A | C | C | C | A | A | A |
| | | Gloss Before retort test | 105.9 | 106.9 | 74.5 | 114.3 | 135.2 | 118.4 | 93.2 | 92.0 |
| | | After retort test | 31.2 | 29.1 | 4.3 | 23.8 | 16.7 | 42.3 | 27.5 | 25.5 |
| | | Amount of reduction | 74.7 | 77.8 | 70.2 | 90.5 | 118.5 | 76.1 | 65.7 | 66.5 |
| | | Evaluation | C | C | C | D | D | C | C | C |

| | | Comparative Examples | B1 | B2 | B3 | B4 | B5 | B6 |
|---|---|---|---|---|---|---|---|---|
| Composition for marking film | Viscosity (mPa · s) | Afet 2 hrs V6 | 770 | 490 | 680 | 410 | 450 | 370 |
| | | V12 | 620 | 470 | 630 | 290 | 310 | 260 |
| | | After 1 day V6 | 930 | 580 | 720 | 580 | 710 | 600 |
| | | V12 | 820 | 550 | 680 | 450 | 540 | 450 |
| | Coarse particles | Method A (μm) | 41 | 73 | 14 | 31 | 46 | 32 |
| | | Method C Number | 2 | 19 | 2 | 2 | 4 | 1 |
| Marking film | Thickness (μm) | | 50 | 50 | 50 | 50 | 100 | 100 |
| | Transparency | Haze (%) | 14.1 | 42.6 | 9.1 | 12.8 | 14.6 | 13.0 |
| | | Evaluation | C | D | B | C | C | C |
| | Water resistance | Whitening through water absorption Haze (%) | 51.2 | 81.5 | 79.2 | 53.0 | 58.2 | 53.5 |
| | | Evaluation | C | D | D | C | D | C |
| | | Recoverability Haze (%) | 29.5 | 43.7 | 5.03 | 24.6 | 27.1 | 24.8 |
| | | Evaluation | C | D | D | C | C | C |

As can be understood from Table 2, the films for a can inner surface of Examples A1 to A13 that were obtained respectively using the compositions of Examples A1 to A13 that respectively contained the polyvinyl chloride aggregate particles of Examples 1 to 13 in which D50 was 0.5 μm or more and 5.0 μm or less, D90 was 8.0 μm or less, and the Na concentration was 90 ppm or less had high transparency and good retort resistance.

As can be understood from Table 2, the films for marking of Examples B1 to B9 that were obtained respectively using the compositions of Examples B1 to B13 that respectively contained the polyvinyl chloride aggregate particles of Examples 1 to 13 in which D50 was 0.5 μm or more and 5.0 μm or less, D90 was 8.0 μm or less, and the Na concentration was 90 ppm or less had high transparency and good water resistance.

On the other hand, as can be understood from Table 3, the films for a can inner surface of Comparative Examples A4, A5, and A8 that were obtained respectively using the compositions of Comparative Examples A4, A5, and A8 that respectively contained the polyvinyl chloride aggregate particles of Comparative Examples 4, 5, and 7 in which the Na concentration exceeded 90 ppm had poor retort resistance. The film for a can inner surface (having a thickness of 20 μm) of Comparative Example A5 and the film for a can inner surface (having a thickness of 100 μm) of Comparative Example A8 that were obtained respectively using the compositions of Comparative Examples A5 and A8 that respectively contained the polyvinyl chloride aggregate particles of Comparative Examples 5 and 7 in which D90 exceeded 8.0 μm had also poor transparency. The films for a can inner surface of Comparative Examples A1 to A3, and A6 that were obtained respectively using the compositions of Comparative Examples A1 to A3, and A6 that respectively contained the polyvinyl chloride aggregate particles of Comparative Examples 1 to 3, and 6 in which D50 exceeded 5.0 μm and D90 exceeded 8.0 μm had poor transparency and poor retort properties.

As can be understood from Table 3, the marking films of Comparative Examples B3, B4, and B6 that were obtained respectively using the compositions of Comparative Examples B3, B4, and B6 that respectively contained the polyvinyl chloride aggregate particles of Comparative Examples 4 and 7 in which the Na concentration exceeded 90 ppm had poor water resistance. The marking films of Comparative Examples B4 and B6 that were obtained using the composition that contained the polyvinyl chloride aggregate particles of Comparative Example 7 in which D90 exceeded 8.0 μm also had poor transparency. The marking films of Comparative Examples B1, B2, and B5 that were obtained using the compositions that contained the polyvinyl chloride aggregate particles of Comparative Examples 1, 3, and 6 in which D50 exceeded 5.0 μm and D90 exceeded 8.0 μm also had poor transparency and poor water resistance.

The invention claimed is:

1. A compound comprising:
   polyvinyl chloride aggregate particles,
   wherein polyvinyl chloride aggregate particles have a particle diameter D50 at a cumulative volume percentage of 50 vol % in a volume particle size distribution is 0.5 μm or more and 5.0 μm or less, and a particle diameter D90 at a cumulative volume percentage of 90 vol % in the volume particle size distribution is 8.0 μm or less, and
   wherein the polyvinyl chloride aggregate particles comprise an Na concentration that is 90 ppm or less.

2. The polyvinyl chloride aggregate particles according to claim 1,
   wherein the polyvinyl chloride aggregate particles are aggregates of polyvinyl chloride latex particles, and the polyvinyl chloride latex particles comprise polyvinyl chloride latex particles having a volume average particle diameter of 0.1 μm or more and less than 0.6 μm in an amount of 5 vol % or more and 95 vol % or less, and polyvinyl chloride latex particles having a volume average particle diameter of 0.6 μm or more and 2.0 μm or less in an amount of 5 vol % or more and 95 vol % or less.

3. The polyvinyl chloride aggregate particles according to claim 1, wherein, in the polyvinyl chloride aggregate particles, the average degree of polymerization of the polyvinyl chloride is 1400 or more and 2500 or less.

4. A method for producing the polyvinyl chloride aggregate particles according to claim 1, the method comprising:
   a step of obtaining a coagulated latex of a polyvinyl chloride by coagulating a polyvinyl chloride latex in which the concentration of resin solids is 22 wt % or more by adding, to the polyvinyl chloride latex, a coagulating agent containing an inorganic acid in an amount of 10 wt % or more;
   a step of obtaining a slurry containing the polyvinyl chloride aggregate particles by subjecting the coagulated latex of the polyvinyl chloride to heat treatment in a temperature range of Tg or more and Tg+35° C. or less, where a glass transition temperature of the polyvinyl chloride is Tg;
   a step of adjusting the slurry containing the polyvinyl chloride aggregate particles such that the slurry has a pH of 4 or more and 11 or less;
   a step of dehydrating the slurry whose pH has been adjusted and that contains polyvinyl chloride aggregate particles, and washing the resulting slurry by adding an amount of water having a weight that is 2 times or more and 100 times or less the weight of the resin solids; and
   a step of dehydrating and drying the washed slurry containing the polyvinyl chloride aggregate particles, and crushing and/or classifying the resulting material.

5. The method for producing the polyvinyl chloride aggregate particles according to claim 4,
   wherein the polyvinyl chloride latex comprises polyvinyl chloride latex particles having a volume average particle diameter of 0.1 μm or more and less than 0.6 μm in an amount of 5 vol % or more and 95 vol % or less, and polyvinyl chloride latex particles having a volume average particle diameter of 0.6 μm or more and 2.0 μm or less in an amount of 5 vol % or more and 95 vol % or less.

6. The method for producing the polyvinyl chloride aggregate particles according to claim 4,
   wherein the heat treatment is performed at a temperature of 75° C. or more and 95° C. or less.

7. The method for producing the polyvinyl chloride aggregate particles according to claim 4,
   wherein after the slurry whose pH has been adjusted and that contains the polyvinyl chloride aggregate particles is dehydrated, the resulting slurry is washed by adding an amount of water having a weight that is greater than 20 times the weight of the resin solids.

8. A composition for a metal can coating material, comprising:
   the polyvinyl chloride aggregate particles according to claim 1.

9. The composition for a metal can coating material according to claim 8, comprising:
   (A) the polyvinyl chloride aggregate particles in an amount of 20 parts by weight or more and 80 parts by weight or less;
   (B) at least one or more resins selected from the group consisting of phenolic resins, epoxy resins, and acrylic resins in an amount of 1 part by weight or more and 30 parts by weight or less;
   (C) a polyester-based resin in an amount of 1 part by weight or more and 60 parts by weight or less; and
   (D) an organic solvent,
   wherein a total amount of (A), (B), and (C) is 100 parts by weight.

10. A composition for a marking film, comprising:
    the polyvinyl chloride aggregate particles according to claim 1.

11. The composition for a marking film according to claim 10, comprising:
    (a) the polyvinyl chloride aggregate particles in an amount of 50 parts by weight or more and 90 parts by weight or less;
    (b) a plasticizer in an amount of 10 parts by weight or more and 50 parts by weight or less; and
    (c) an organic solvent,
    wherein a total amount of (a) and (b) is 100 parts by weight.

12. A coating film made of a composition containing the polyvinyl chloride aggregate particles according to claim 1, wherein the coating film has a thickness of 20 μm or less, has a haze value of 10.0% or less, and a gloss value of 50 or more, the gloss value being determined after the coating film is immersed in pure water for 90 minutes in an atmosphere of 0.26 MPa and 121° C.

\* \* \* \* \*